United States Patent [19]

Ratzlaff et al.

[11] Patent Number: 4,815,266

[45] Date of Patent: Mar. 28, 1989

[54] CONTINUOUS ROUND BALER WITH ACCUMULATING TRAILER

[75] Inventors: Howard J. Ratzlaff, Hesston; Ferol S. Fell, Newton, both of Kans.

[73] Assignee: Hesston Corporation, Hesston, Kans.

[21] Appl. No.: 103,526

[22] Filed: Sep. 30, 1987

[51] Int. Cl.⁴ ............................................ A01D 39/00
[52] U.S. Cl. ......................................... 56/341; 100/88
[58] Field of Search ..................... 56/341, 344; 100/88

[56] References Cited

U.S. PATENT DOCUMENTS

| | | | |
|---|---|---|---|
| 4,386,493 | 6/1983 | Holdeman | 56/341 |
| 4,534,285 | 8/1985 | Underhill | 56/341 X |
| 4,633,659 | 1/1987 | Anstey et al. | 56/341 |

*Primary Examiner*—Stephen F. Husar
*Attorney, Agent, or Firm*—Hovey, Williams, Timmons & Collins

[57] ABSTRACT

The baler has a "vertical" bale starting chamber in which the upwardly moving rear belts and the downwardly moving front belts cooperate to tumble and roll incoming material into a bale. When the bale reaches full size in the expanded chamber, the bale is lifted while still in its chamber to a wrapping station where it continues to spin as a binding wrapper is applied. During the lifting of the finished bale and subsequent application of the wrapper, fresh material entering the continuously moving baler is confined beneath the finished bale in a new starting chamber, whereupon the cycle is repeated. As the new bale grows, a discharge ramp becomes formed by certain stretches of the belts and rollers to gravitationally discharge the wrapped bale from the baler without stopping advancement of the machine. An accumulating trailer is hitched to the baler in a position to receive bales from the discharge ramp as they gravitate down the same and to temporarily store the accumulated group of bales until the operator selects a site for dumping the bales.

9 Claims, 15 Drawing Sheets

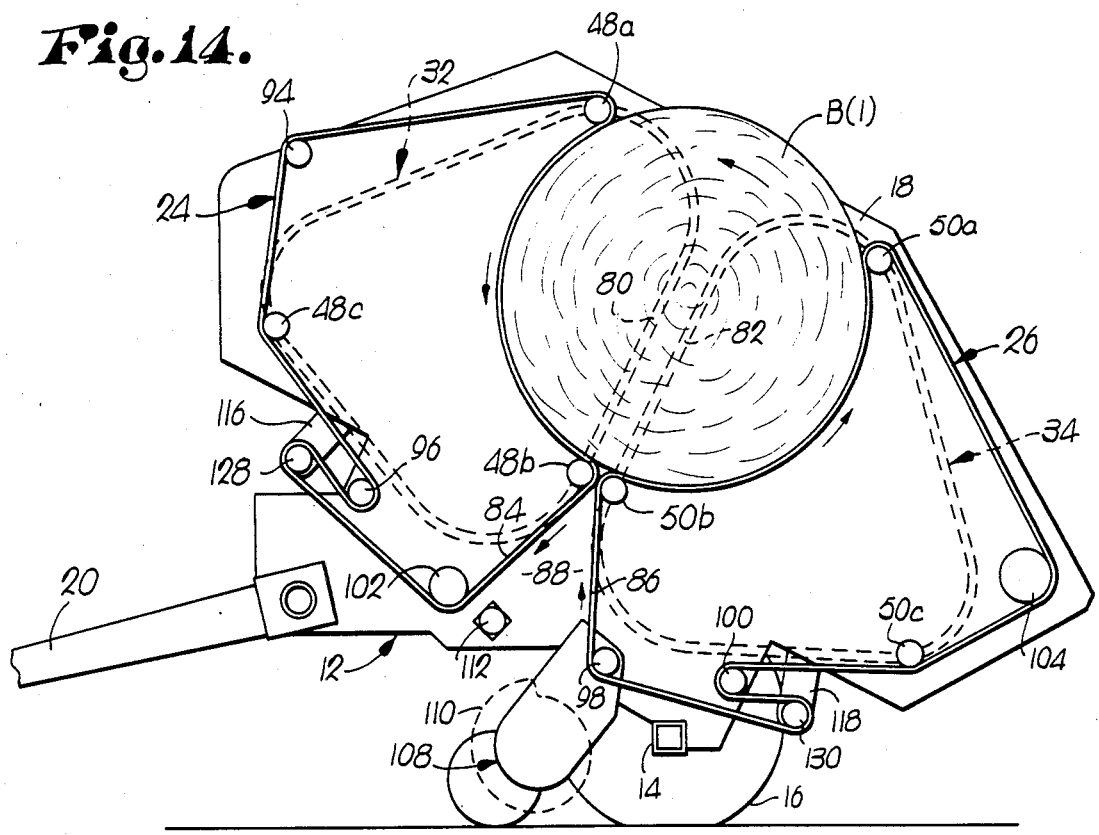
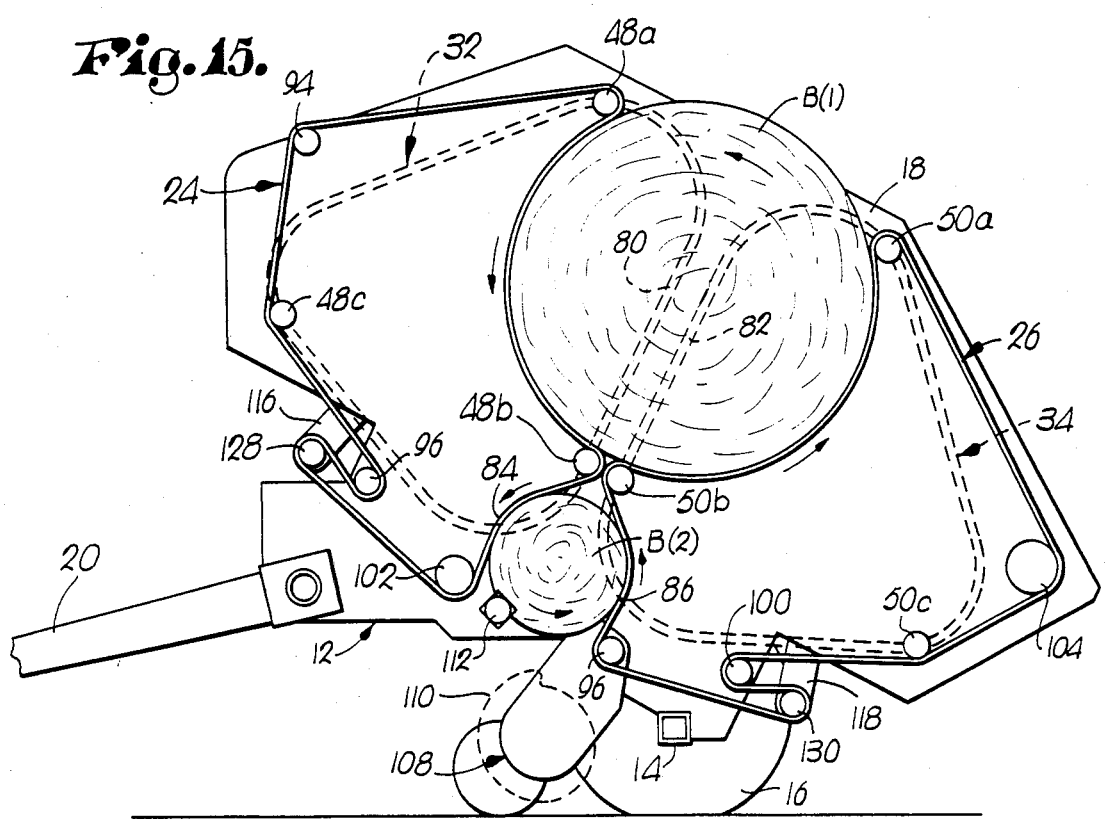

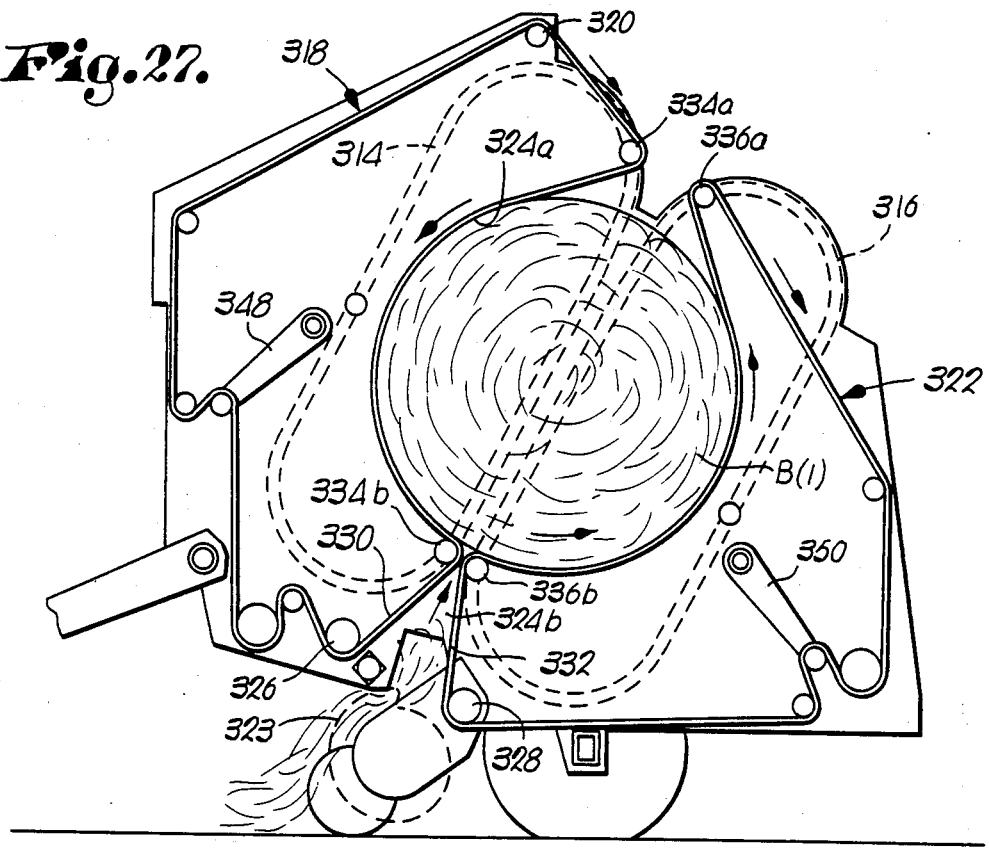
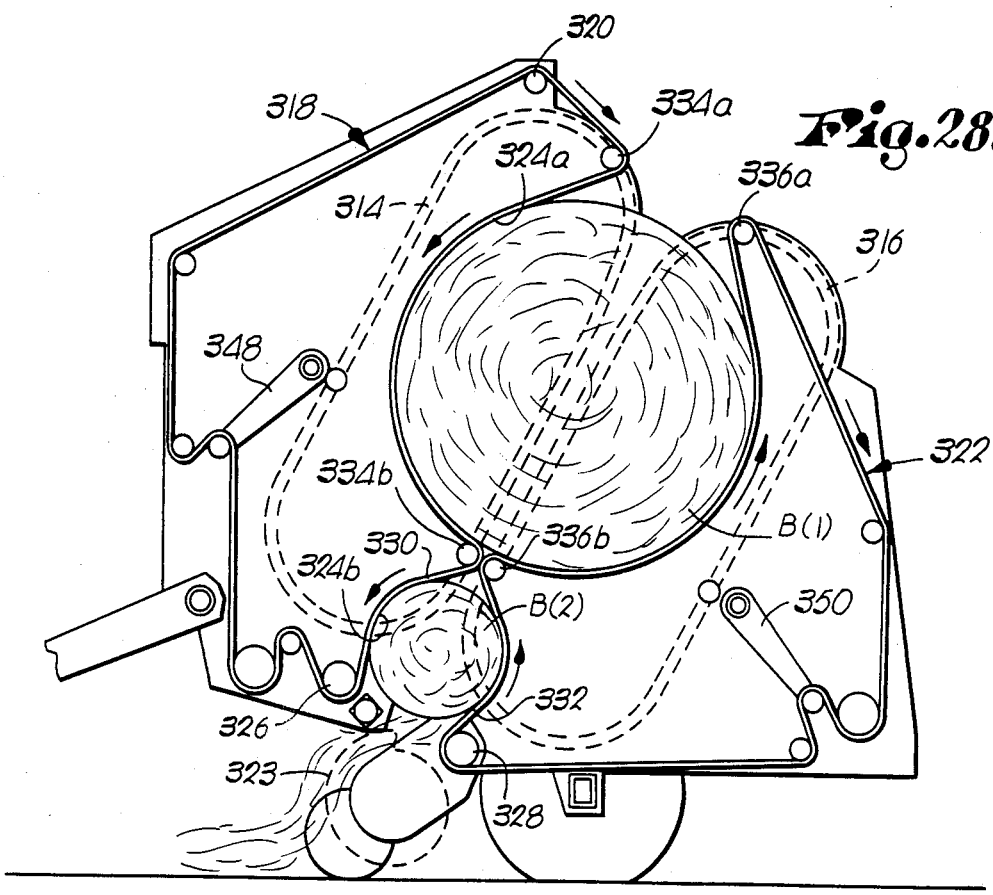

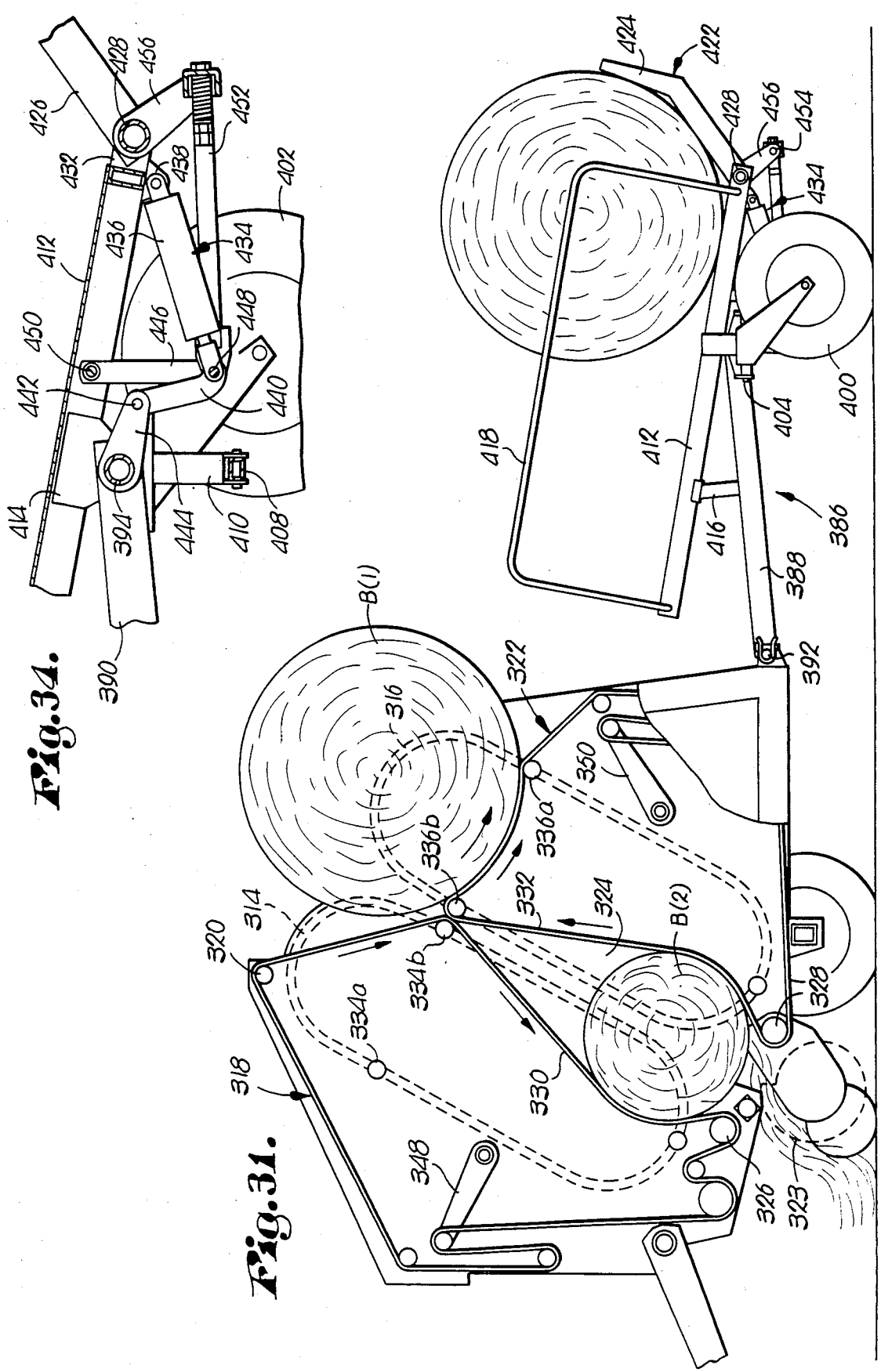

CONTINUOUS ROUND BALER WITH ACCUMULATING TRAILER

TECHNICAL FIELD

This invention generally relates to crop harvesting techniques and, more particularly, concerns a baler for making large round bales of crop material on a continuous basis and temporarily accumulating the prepared bales in an associated cart for subsequent dumping at a site selected by the operator.

BACKGROUND

Large round bales have become an exceedingly popular package in which to store a variety of crop materials, ranging from alfalfa to corn stalks. The large cylindrical configuration and generally uniform density of the bales enhance their weathering characteristics, allowing the bales to remain in the field until needed. Additionally, the bales concentrate large quantities of crop material in individual packages, reducing the time required to gather and transport a given amount of crop material when needed. Further, other than a tractor operator, no manual labor is required to gather and transport the bales from the field. In sum, the benefits of large round bales are consistent with the continuing trend toward highly mechanized agricultural operations.

Conventional large round balers require discharge of a completed bale before formation of a new bale is started. Such requirement consumes a significant amount of the total baling time.

Several proposed designs exist in the prior art of round balers which appear to be capable of continuous operation. See, for example, U.S. Pat. Nos. Nos. 4,035,999 and 4,499,714. However, neither of these proposed designs has achieved commercial acceptance. Apparently, the projected increases in productivity expected to be gained using balers of these designs were outweighed by the complexity, costs, and other unresolved problems associated therewith.

SUMMARY OF THE PRESENT INVENTION

The present invention provides a large round baler and baling method designed to achieve the heretofore elusive goal of continuous baling operation. Furthermore, the present invention is intended to capitalize on the heretofore highly successful "vertical chamber" round baling concepts pioneered in U.S. Pat. Nos. 4,321,787; 4,386,493; and 4,182,101 by providing a way of utilizing such vertical chamber concepts in a continuous round baler. Additionally, the present invention is intended to provide a convenient way of accumulating Q a number of the continuously packaged bales as they issue periodically from the baler so that the operator may thereafter dump the collected bales in a group at a site of his selection, but without interfering with the continuous harvesting operations of the baler itself.

Pursuant to these objectives, the present invention contemplates a continuous baler which, preferably, starts each bale in a "vertical chamber" of the type illustrated in the '787, '493 and '101 patents. The bale forming proceeds in the usual way until the bale reaches full size, whereupon while still contained in its chamber, it is lifted into a raised position as fresh material continues to enter the baler beneath the rising bale. As the finished bale rises, a new vertical starting chamber is created beneath the rising bale to capture the incoming materials and to commence forming the next bale. If desired, after the upper bale has been raised sufficiently to allow formation of the new starting chamber therebeneath, the upper bale may remain in the baler and continue turning while a suitable wrapping material such as binding twine is coiled about the bale.

As the new bale grows in the lower portion of the baler, it continues to progressively push the upper bale higher and higher in the baler and to cause the upper bale to be released from the control of forming belts which have previously been used to compact the bale and drivingly rotate the same during its formation and wrapping cycles. Ultimately, the bale growing in the lower portion of the baler increases to such a size that the upper bale is presented to a rearwardly inclined ramp formed by adjacent belt and roller portions of the baler such Q that the bale simply discharges from the baler by gravity down such effective ramp. In another form of the invention, the completely formed and preferrably wrapped bale is intentionally discharged before the next bale is large enough to accomplish such function by raising positioning rollers normally disposed between the upper and lower chambers a sufficient extent as to force the bale out of the baler, whereupon the positioning rollers are retracted back down into close overlying relationship with the newly forming bale.

With regard to the accumulating aspects of the invention, the present invention contemplates having a continuous baler in which bales are periodically issued from the top of the baler, roll down a rearwardly inclined ramp on the baler, and drop into an awaiting accumulating trailer having a bed which is slightly rearwardly inclined so that the discharged bales roll automatically to the lower rear end of the bed until halted by a normally upstanding tailgate When the operator has selected a suitable dump site, such as adjacent one end of the field where the ends of windows are located, the tailgate may be lowered to release the accumulated bales by gravity for subsequent pickup and removal if desired.

These and other advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

FIGS. 10 through 16 are schematic views of the baler showing the sequence of steps it performs in making and discharging bales on a continuous basis;

FIGS. 23 through 30 are schematic views of the second embodiment of the invention showing the sequence of steps which occur in making and discharging bales on a continuous basis with the second embodiment;

FIG. 31 is a schematic, fragmentary, side elevational view of a top discharging continuous round baler (with the near sidewall broken away to reveal internal details of construction) and an accumulating trailer hitched to the rear thereof for receiving discharging bales from the baler;

FIG. 34 is an enlarged, fragmentary elevational view of the accumulating trailer with the near wheel removed and portions thereof illustrated in cross section to reveal details of construction.

DETAILED DESCRIPTION

Figure 1:
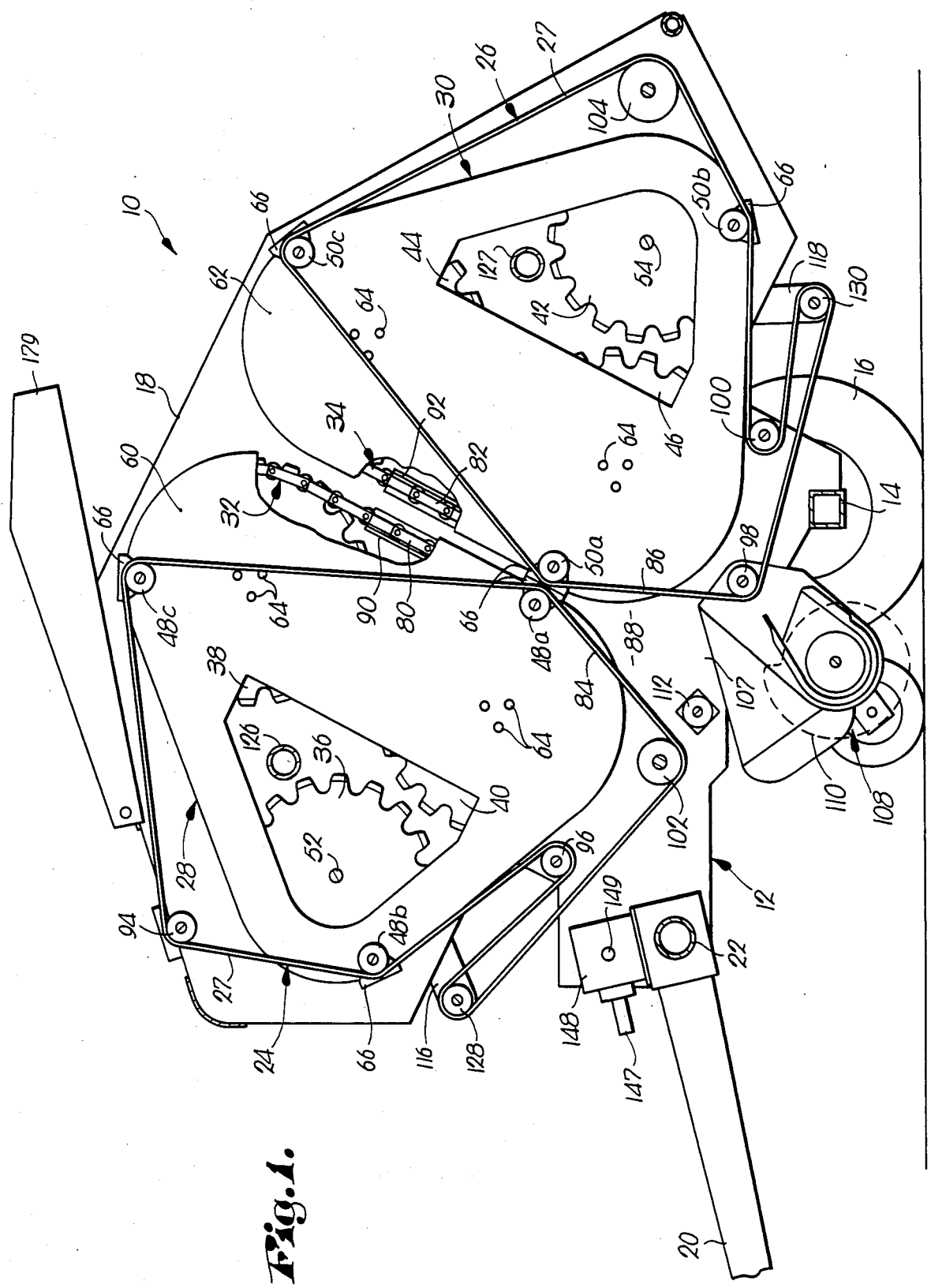
FIG. 1 is a left side elevational view of a large round baler constructed in accordance with the principles of the present invention with the near sidewall of the baler removed to reveal internal details.

In the following description, right hand and left hand references are determined by standing at the rear of the baler and facing in the direction of forward travel.

Referring now to the drawings, and particularly to FIGS. 1 to 4, there is shown a continuous round baler generally designated by the numeral 10 and comprising a preferred embodiment of the present invention. The baler 10 is "continuous" in the sense that it can be constantly moved across the field on a non-stop basis without pausing during ejection of a completed bale.

The baler 10 has a mobile frame 12 that includes a transverse axle 14 supported by a pair of laterally spaced apart ground wheels 16. A pair of spaced apart upright sidewalls 18 are mounted on frame 12, and a centrally located tongue 20 extends forwardly from a cross beam 22 of frame 12 to adapt the baler 10 for connection to a towing tractor.

For forming large round bales on a continuous basis, the baler 10 has mirror-imaged front and rear sets 24 and 26 of endless flexible bale rolling members, preferably in the form of identical, side-by-side positioned endless flexible belts 27 between sidewalls 18. Also, the baler 10 has mirror-imaged front and rear control mechanisms 28 and 30 which function to engage the belt sets 24, 26 and periodically reshape their respective closed loop configurations according to different, successive stages of operation in the baling process.

More particularly, the control mechanisms 28 and 30 include on the interior of each sidewall 18 front and rear endless flexible chains 32 and 34 arranged in triangular patterns on and around corresponding sets of three triangularly-arranged, rotatable sprockets 36-40 and 42-46.

Figure 2:
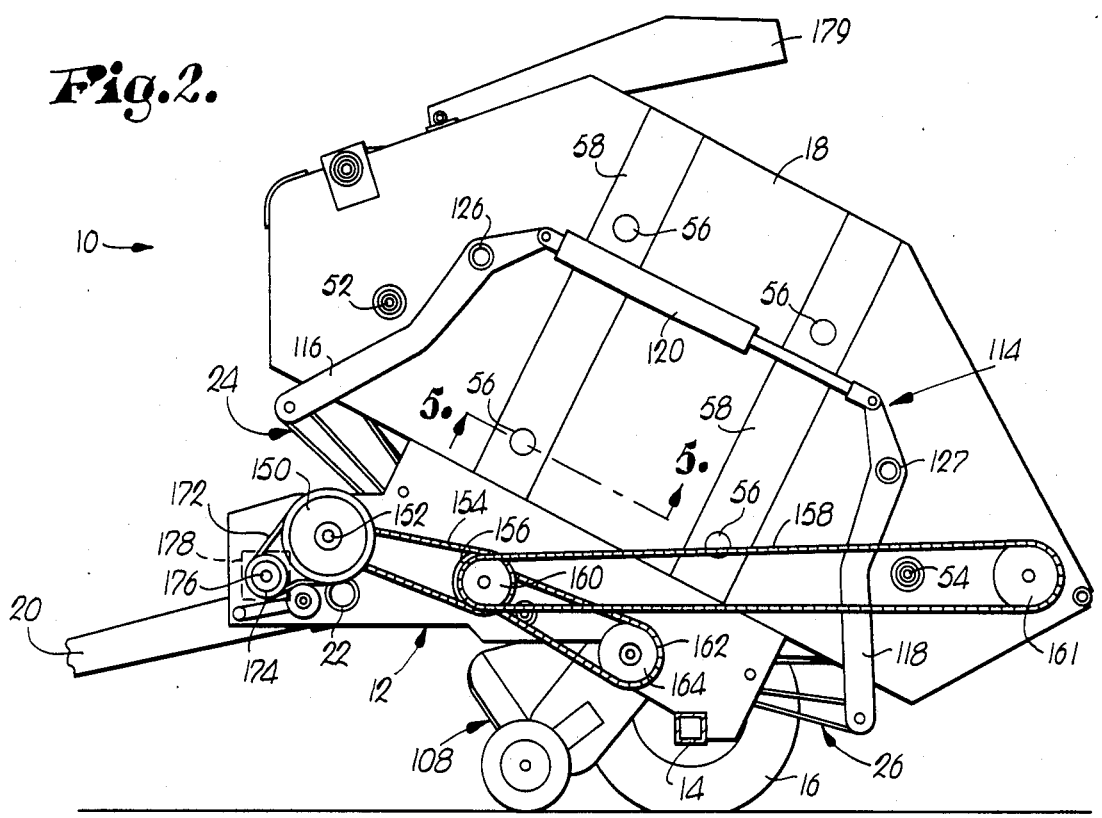
FIG. 2 is a left side elevational view, on a smaller scale than that of FIG. 1, of the baler.
Figure 3:
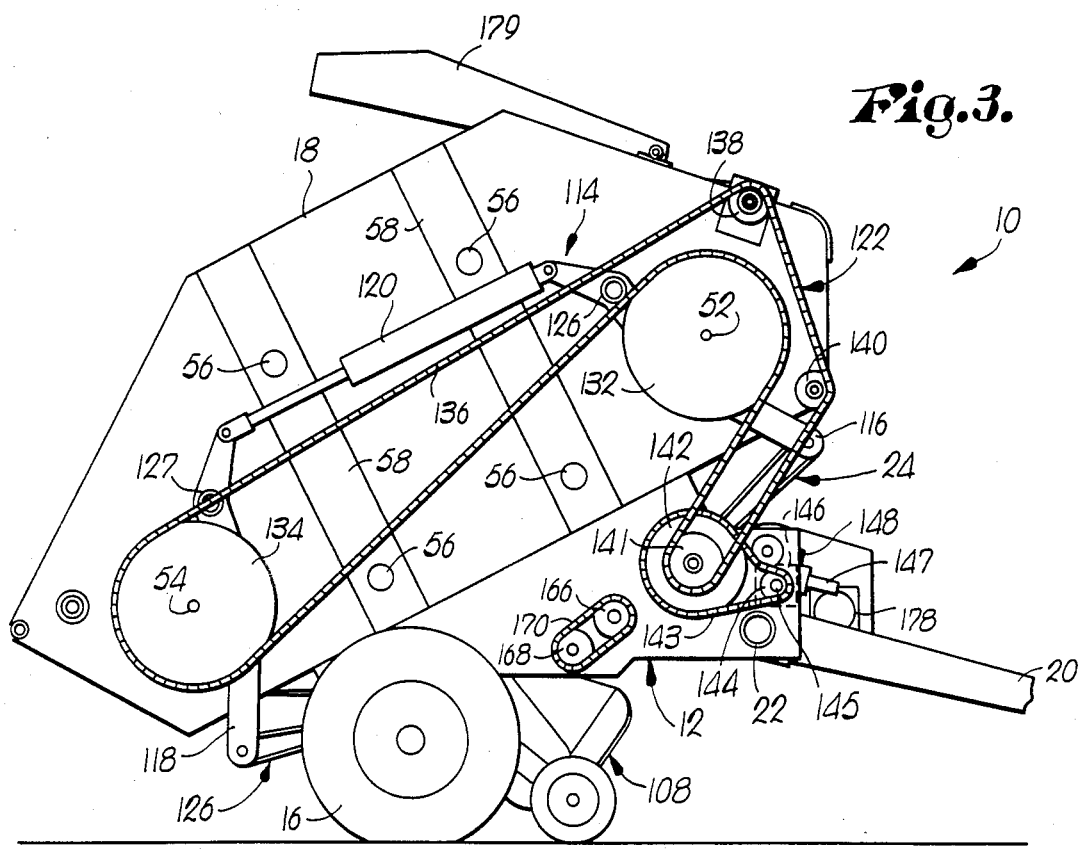
FIG. 3 is a right side elevational view, on the same scale as FIG. 2, of the baler.

Further, the front mechanism 28 includes three spaced positioning rollers which span the baler to interconnect the two front chains 32, and the rear mechanism 30 includes three spaced positioning rollers 50 which span the baler to interconnect the two rear chains 34. The two front sprockets on opposite sides of the baler are secured to a common drive shaft 52 that spans the baler, while the two rearmost sprockets 42 on opposite sides of the baler are secured to a common drive shaft 54 that spans the sidewalls 15 at that location. On the other hand, the remaining sprockets 38,40,44, and 46 are each carried by respective idler stub shafts 56 on opposite sides of the baler as seen in FIGS. 2 and 3.

A pair of front and rear triangular shields 60 and 62 on each sidewall 18 cover the sprockets 36-40 and 42-46 so as to prevent crop material from contacting the sprockets and accumulating thereon. The shields 60 and 62 are mounted in stationary positions, being connected at 64 to the inner ends of the stub shafts 56.

Figure 4:
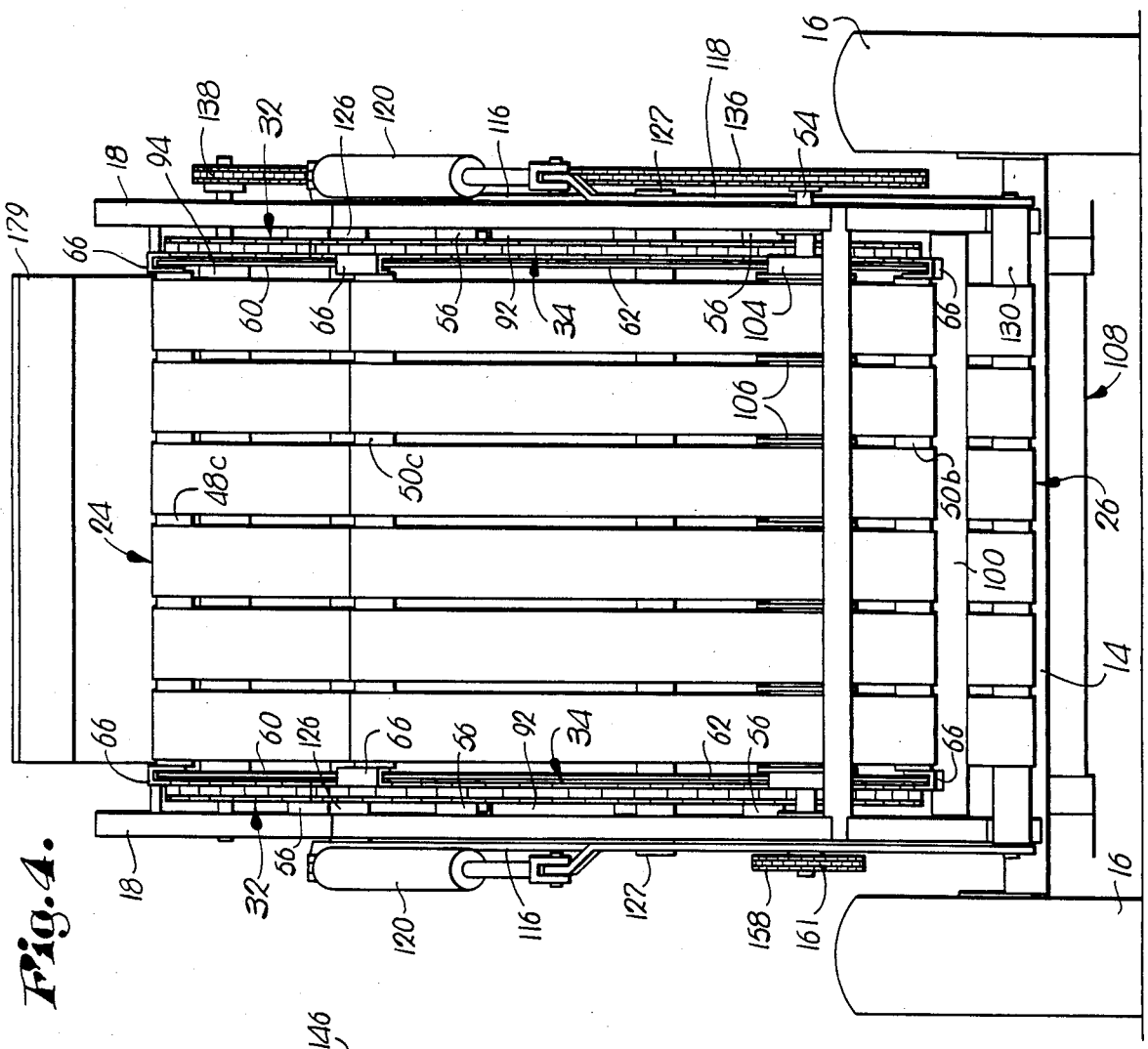
FIG. 4 is a rear elevational view of the baler.
Figure 5:
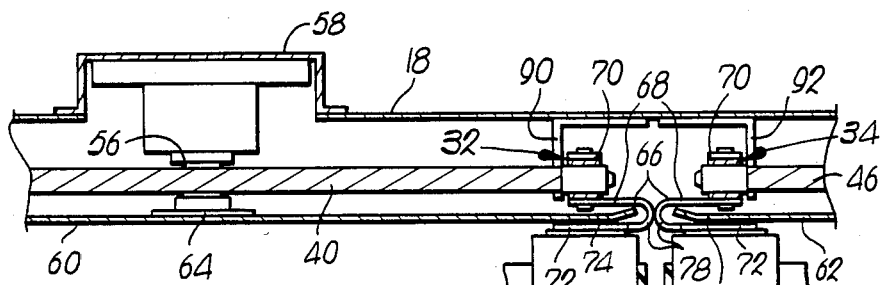
FIG. 5 is an enlarged fragmentary view, partly in section, taken generally along line 5—5 in FIG. 2 and illustrating the manner in which rollers of the baler are attached to drivable positioning chains behind cover panels on opposite sides of the baler.
Figure 7:
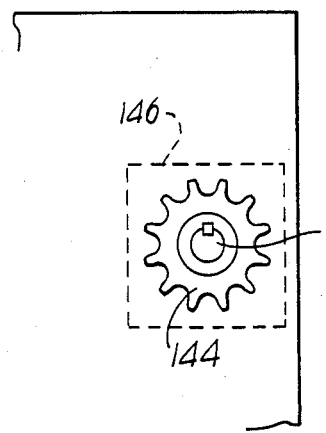
FIG. 7 is an enlarged end view of the hydraulic motor utilized to actuate the roller positioning chains and showing a ratchet gear and dog arrangement associated therewith for preventing the motor from driving the positioning chains in reverse.
Figure 6:
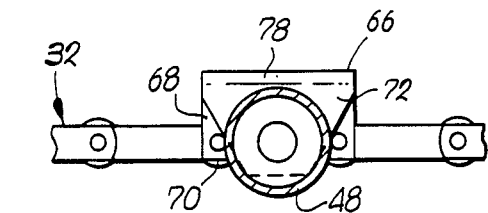
FIG. 6 is an enlarged fragmentary view of the means by which the guide rollers are connected to their positioning chains.
Figure 10:
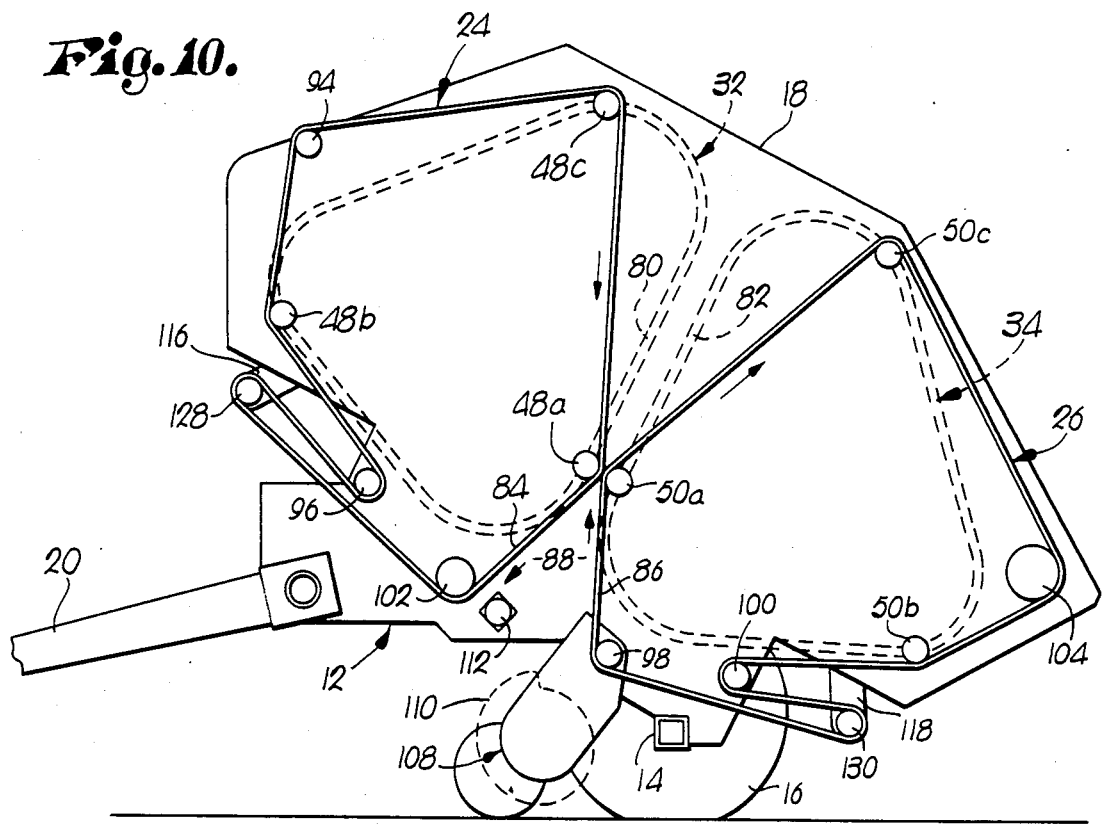

As seen in FIGS. 4-6, the guide rollers 48 and 50 are attached at their opposite ends by generally U-shaped connectors 66 to the positioning chains 32 and 34. Each connector 66 has an outer leg portion 68 attached to one link 70 of the corresponding chain 32 or 34 and an inner leg portion 72 attached to the end of its roller. Peripheral edge margins 74 and 76 of the respective shields 60 and 62 project into the bight portions 78 of connectors 66.

Among other things, the control rollers 48, 50 cooperate with the front and rear belt sets 24, 26 to define successively formed baling chambers throughout operation of the baler. In this respect each of the front rollers 48 is matched or paired up with a corresponding rear roller 50 so as to be at corresponding positions in their respective paths of travel at all times in the baling operation. The matched pairs of rollers are identified by the same letter, for instance "a", "b", or "c", after their respective reference numerals in FIG. 1. As the rollers move in their respective triangular paths of travel, they periodically come together in their matched pairs and move in an upward course of travel along the parallel generally upright and upwardly moving stretches 80 and 82 of the chains 32, 34. When in the position of rollers 48a, 50a, they bring front and rear stretches 84 and 86 of the belts 24 and 26 together into an upright, triangularly-shaped starting configuration of a bale forming chamber, generally identified as 88 in FIG. 1 with the rollers 48a, 50a specifically forming a closed lid or top of the chamber 88. Since the matched pairs of rollers, 48a, 50a, 48b, 50b, and 48c, 50c are displaced from one another a distance which is greater than the length of the vertical stretches 80, 82 of chains 32, 34, only one forming chamber 88 with a closed lid or top can be formed at one time. Front and rear guide bars 90 and 92 on each of the sidewalls 18 help maintain the chain stretches 80 and 82 in their parallel relationship.

Referring still to FIG. 1, it will be seen that the front and rear sets of belts 24 and 26 are also entrained about respective front and rear pairs of rotatable idler rollers 94, 96 and 98, 100 spanning the sidewalls 18. Further, the belts 24 and 26 are respectively looped around front and rear oppositely rotating drive rollers 102 and 104. As seen illustrated in FIG. 4 with respect to rear drive roller 104, both drive rollers 102, 104 are provided with axially-displaced and circumferentially-extending, plate-like spacers 106 secured thereto which maintain the desired spacing between the side-by-side arranged belts. Also as shown in FIG. 1, it is the front drive roller 102 and the rear idler roller 98 which together hold the sets of belts 24 and 26 in spaced relationship to one another at a lower region of the sidewalls 18 so as to assist the roller pair 48a, 50a in defining the triangular starting configuration of the baler rolling chamber 88 and in maintaining an open entry throat 107 for each successive forming chamber 88.

A crop material pickup 108 is mounted transversely across the frame 12 between its sidewalls 18 and below the open throat 107. The pickup 108 has a plurality of crop material gathering tines (not shown) which move in the rotational path represented by the dashed line 110 in FIG. 1 for delivering crop material from the field up through the throat 107 and chamber 88 as the baler moves across the field. Also, above the pickup 108 and located nearer to the front drive roller 102 than to the rear idler roller 98, a powered roller 112 extends transversely across the open bottom of the chamber 88 at the upper, forward extremity of throat 107 and is rotatably mounted to the opposite sidewalls 18. The clockwise-rotating roller 112 (viewing FIG. 1) cooperates with the triangularly-configured stretches 84 and 86 of the respective belts 24 and 26 to roll crop material received in the chamber 88 in a counterclockwise direction (viewing FIG. 1) in forming a round bale therein.

Formation of a round bale of desired density in the bale rolling chamber 88 is accomplished by applying a desired level of pressure on the crop material as it is rolled by the belts 24, 26, while, at the same time, allowing the chamber to grow in size to accommodate growth in the size of the bale In this respect, a tensioning mechanism, generally designated 114 (FIGS. 2 and 3), is provided on the baler 10 for tensioning the front and rear sets of belts 24 and 26.

More particularly, as seen in FIGS. 1-4, the tensioning mechanism 114 includes front and rear take-up arms 116 and 118 on each sidewall 18 and a pair of hydraulic actuators 120 therefor. The front arms 116 are interconnected intermediate their ends and across the baler by a common torque tube 126, while the rear arms 118 are similarly interconnected by a torque tube 127. Tubes 126, 127 are journalled by the sidewalls 18 so as to adapt the arms 116 and 118 for fore-and-aft swinging movement about the axes of tubes 126, 127.

The tensioning mechanism 114 further includes a pair of take-up rollers 128 and 130 spanning the baler and are rotatably mounted at their opposite ends to the lower ends of the front and rear take-up arms 116 and 118. The front and rear take-up rollers 128 and 130 are back wrapped, as are the front and rear idler rollers 96 and 100, by the respective front and rear sets of belts 24 and 26 so as to "store" extra lengths of the belts when needed for expansion of the bale forming chamber 88. When the take-up arms 116 and 118 are pivoted counterclockwise and clockwise respectively (viewing FIG. 2), the extra lengths of belts 24 and 26 are paid out to permit chamber expansion, whereas when they pivot in the opposite rotational senses, belt length is stored between the rollers 96, 128 and 100, 130 so as to permit starting of the chamber 88 at its initial contracted size.

The hydraulic actuators 120 extend between and are coupled to the upper ends of the front and rear take-up arms 116 and 118 along the exterior of the opposite sidewalls 18. In such manner, upon extension or contraction of the actuators 120 the front arms 116 and rear arms 118 are concurrently pivoted the same amount although in opposite directions. Thus, the same amount of belt length is paid out or stored in the front belts as in the rear belts.

The two positioning control mechanisms 28, 30 are powered by a drive train 122 disposed along the right frame side wall 18 as seen in FIG. 3. The drive train 122 includes a pair of large, front and rear driven sprockets 132 and 134 secured to front and rear shafts 52 and 54 respectively which extend outwardly from the right sidewall 18. A drive transmitting, endless chain 136 back wraps and crosses over an imaginary line connecting the rotational axes of the sprockets 132 and 134 so as to drive the sprockets in opposite rotational directions indicated by the arrows in FIG. 3. The drive chain 136 is also entrained about a pair of idlers 138 and 140 rotatably mounted to the right sidewall 18 forwardly of the front sprocket 132. The idlers route the drive chain 136 clear of the front sprocket 132 for entrainment about a lower sprocket that inputs motion to chain 136. Sprocket 141, in turn, is fixed for rotation with another, larger sprocket 142 driven by an endless chain 143 entraining a smaller, forwardly located sprocket 144 fixed on the output shaft 145 of a source of rotary power, such as a hydraulic motor 146 (FIGS. 3, 7, 8, and 9).

The source of motive power for the pickup 108 and the belt drive rollers 102, 104 is the power take-off shaft of the towing tractor from which rotational motion is transmitted by telescoping shafts (not shown) to the input shaft 147 of a right angle gear box 148 on the front part of the baler.

From an output shaft 149 (FIG. 1) of the gear box 148, rotational motion is transmitted to a large sheave 150 (FIG. 2) through a shaft 152 and to a sprocket (not shown) behind the sheave 150 secured to the same drive shaft 152 as the sheave 150. An endless chain 154 transmits rotation from the sprocket on shaft 152 to a sprocket 156 on one end of the front drive roller 102 and from the front drive roller 102 to the rear drive roller 104 via another chain 158 entrained about a pair of sprockets 160 and 161 attached to the respective rollers. In such manner, the rollers 102 and 104 and thereby the front and rear sets of belts 24 and 26 are driven in the same clockwise sense viewing FIG. 1 which causes their adjacent stretches 84 and 86 to move in opposite generally vertical directions, the rear stretch 84 moving upwardly and the front stretch 86 moving downwardly. Further, another endless chain 162 entrains a sprocket 164 on the pickup 108 for rotating its tines in the direction of the arrow seen in FIG. 1. As viewed in Fig. 3, a sprocket 166 on the right side of the front drive roller 102 and a sprocket 168 on an end of the bale chamber roller 112 are entrained by a chain 170 for driving the roller 112 from the drive roller 102.

A belt 172 (FIG. 2) transmits rotation from the sheave 150 on shaft 152 to a smaller sheave 174 on the input shaft 176 of a hydraulic pump 178. The pump 178 is hydraulically connected to the hydraulic actuators 120 for the take-up arms 116, 118 and to the hydraulic motor 146 for the control mechanisms 28 and 30.

Operation of the Embodiment of FIGS. 1–21

Figure 11:
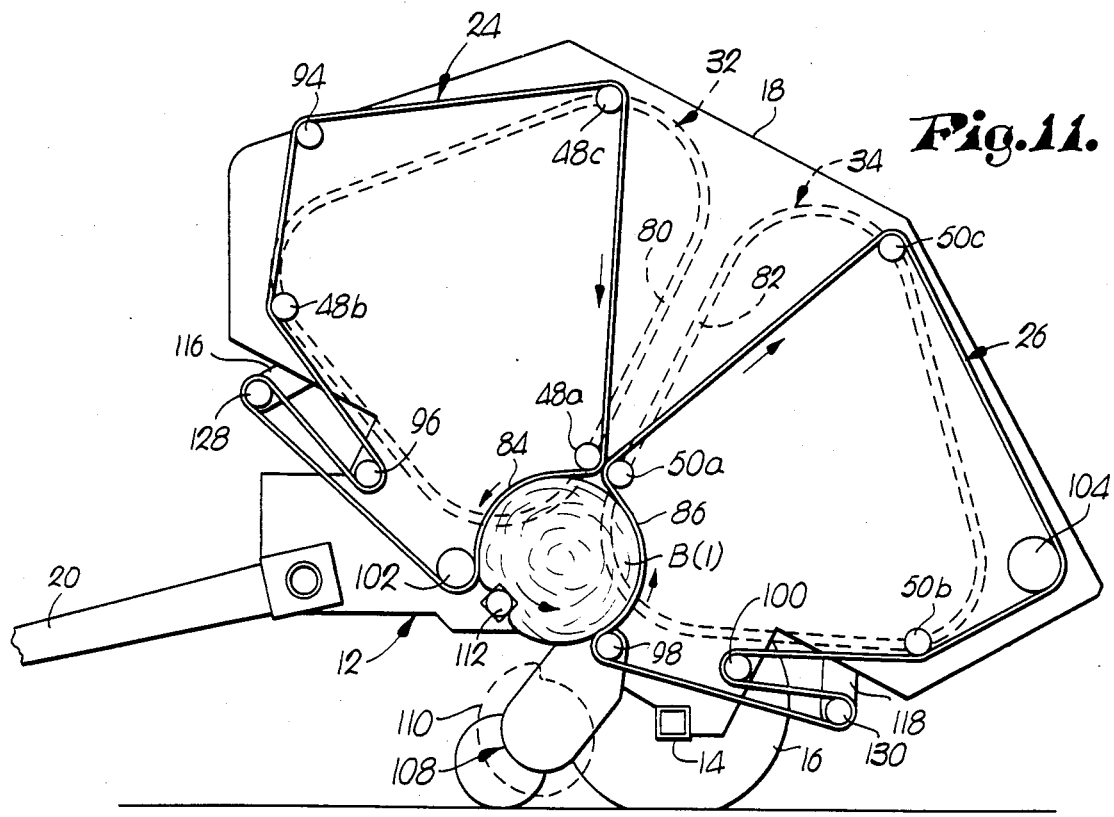
Figure 12:
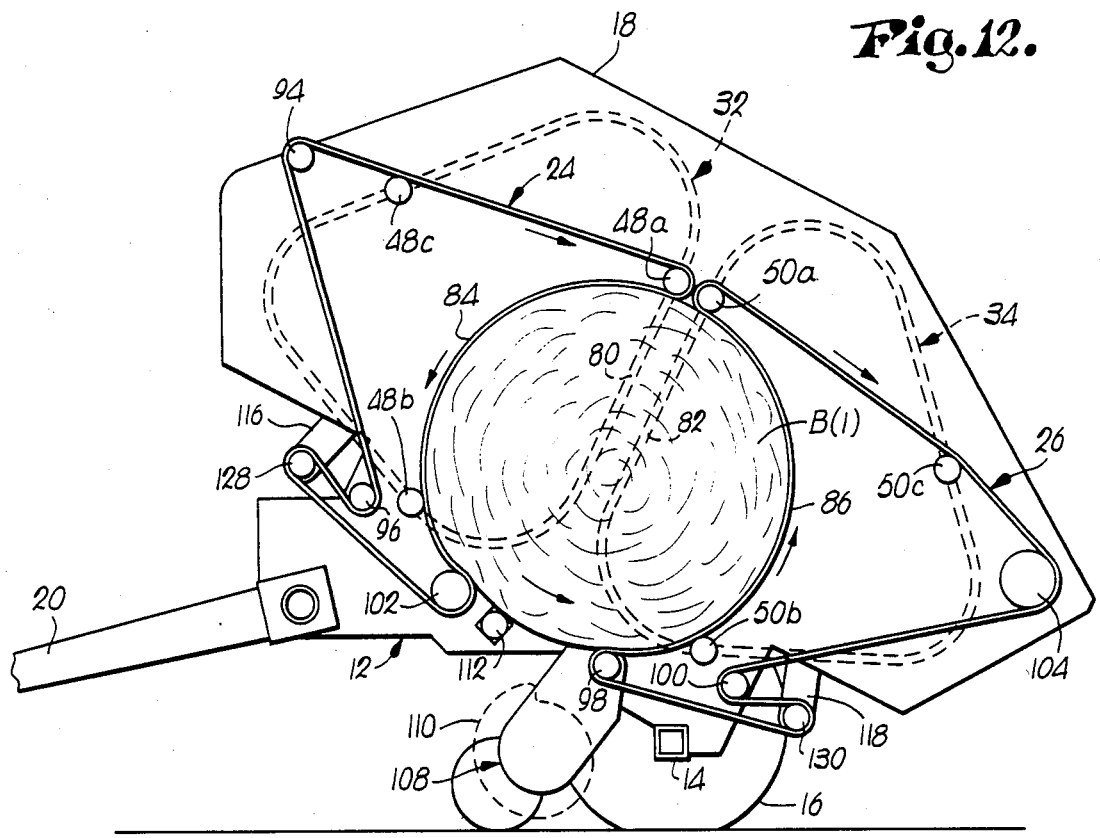

The operation of the continuous baler is illustrated schematically in FIGS. 10–16. As the baler moves across the field in the "empty" condition of FIG. 10, the pickup 108 continuously lifts windrowed materials off the ground and introduces them into the baling chamber 88 through the bottom, open throat entrance thereof. Such materials are acted upon by the countermoving belt stretches 84 and 86 to cause the material to tumble forwardly within chamber 88 and progressively coil up into a larger and larger bale as illustrated in FIG. 11. The positioning rollers 48a and 50a resist upward movement at this time to provide yieldable down pressure against the forming bale, but as the bale continues to grow and exert sufficient upwardly directed force against the rollers 48a, 50a, the latter shift upwardly as illustrated in FIG. 12.

By the time the bale B(1) reaches the diameter illustrated in FIG. 12, it is full size. Consequently, at that time a strand of binding twine or the like may be introduced from an overhead bale wrapper unit 179 (FIG. 1) down to the rotating bale B(1) to be entrained by the latter, which causes the twine to start wrapping around the rotating bale.

Figure 13:
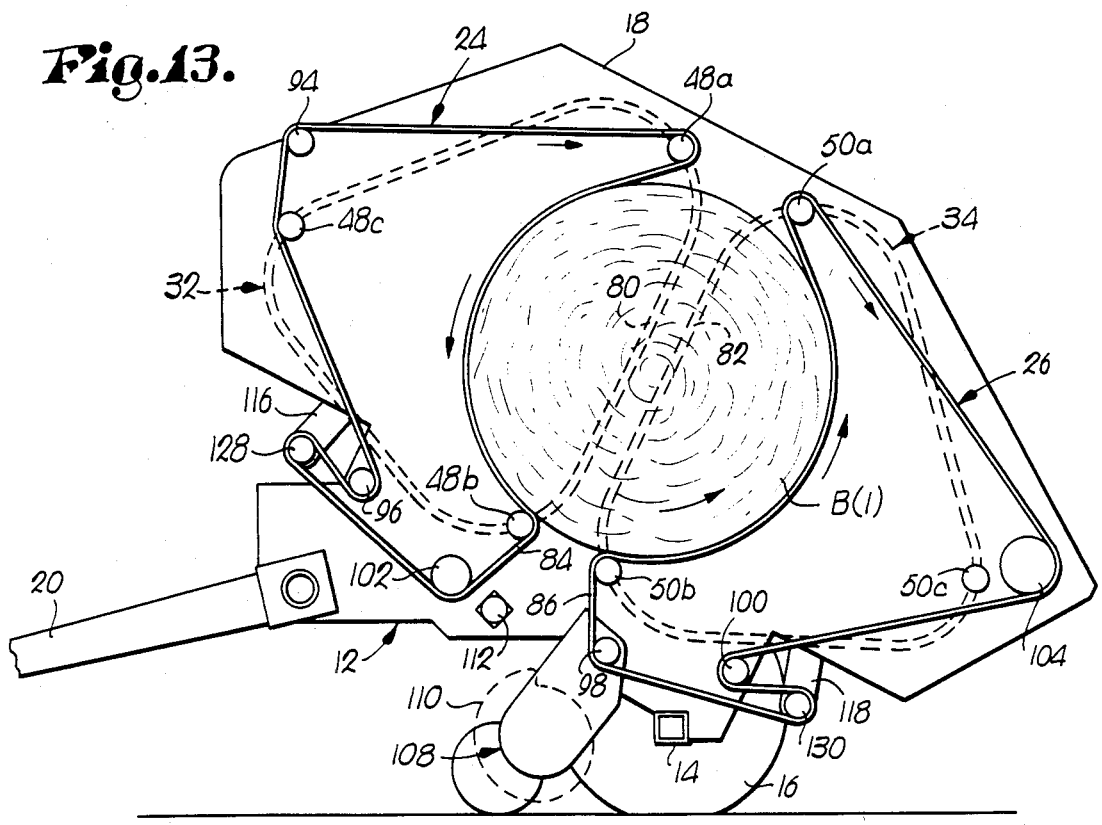

Essentially simultaneously with commencement of bale wrapping, power is supplied to the positioning chains 32 and 34 to cause the next positioning rollers 48b, 50b to start moving under the bale B(1) and lifting the bale B(1) toward a raised position, such action being illustrated in FIG. 13. Ultimately, the positioning rollers 48b, 50b come together and move a short distance up along their upward course of travel as illustrated in FIG. 14, at which point the rollers 48b, 50b momentarily pause.

The bale B(1) continues to rotate in the FIG. 14 position so that the binding cycle may be completed. Likewise, it has continued to rotate all that while the rollers 48b, 50b have raised the bale B(1) from the lower position of FIG. 12 to the higher position of FIG. 14.

Simultaneously, new crop material has continued to enter the baler via the pickup 108 as the baler has continued moving non-stop across the field. Such new material has been introduced during this time into a new baling chamber formed beneath the rising bale B(1) and confined at the top by rollers 48b, 50b as illustrated in the transition from FIG. 13 to FIG. 14. As the two rollers 48b, 50b come together in the FIG. 14 position, they effectively close off the upper end of the new baling chamber 88 and cause material which might otherwise flow up to the bale B(1) to instead turn down along the front belt stretch 84 and start coiling into a new bale B(2) as illustrated in FIG. 15.

As the new bale B(2) begins to form as illustrated in FIG. 15, the rollers 48b, 50b resist upward movement, but such resistance is overcome as the bale B(2) continues to enlarge. Consequently, as bale B(2) continues to grow, it also pushes the overhead bale B(1) further upwardly. This movement also has the effect of separating the rollers 48a and 50a so that, by the time the baler reaches the condition of things illustrated in FIG. 16, the bale B(1) is fully released by the belts and can gravitate down a rearwardly inclined ramp defined by rollers 50a, 50b and the upper stretch of the rear belts.

Thereafter, formation of the bale B(2) continues until such time as it reaches the full size condition of FIG. 12, whereupon the cycle is repeated.

It is to be noted that, depending upon the type of binding material used for the bales, the wrapping cycle may or may not start while the bale is still in the main baling chamber. With twine as the wrapping medium, and in order to maintain the integrity of the bale during such time as it is subjected to squeezing and lifting stresses by the positioning rollers, it has been found desirable to start the binding cycle while the bale is still its initial, lowered position.

Hydraulic Control Circuit of the Embodiment of FIGS. 1–21

Figure 8:
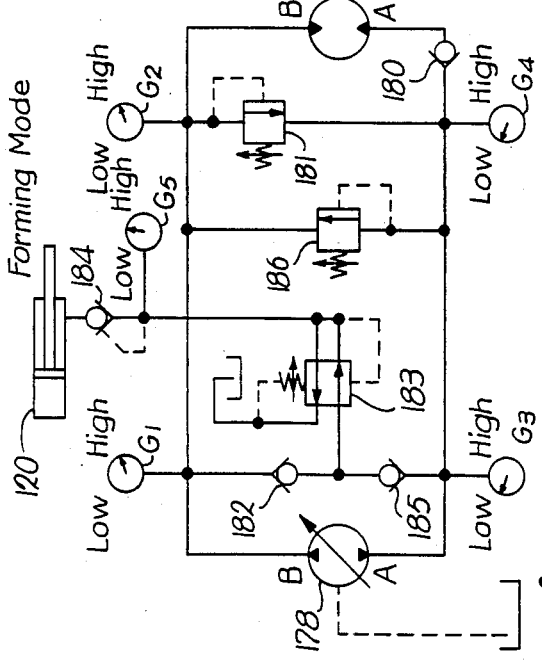
FIGS. 8 and 9 are schematic views of the hydraulic circuit and components for controlling operation of the positioning chains and bale-forming belt tension, showing the circuit and components in a chain retarding mode in FIG. 8 and in a bale lifting mode in FIGS. 9.
Figure 9:
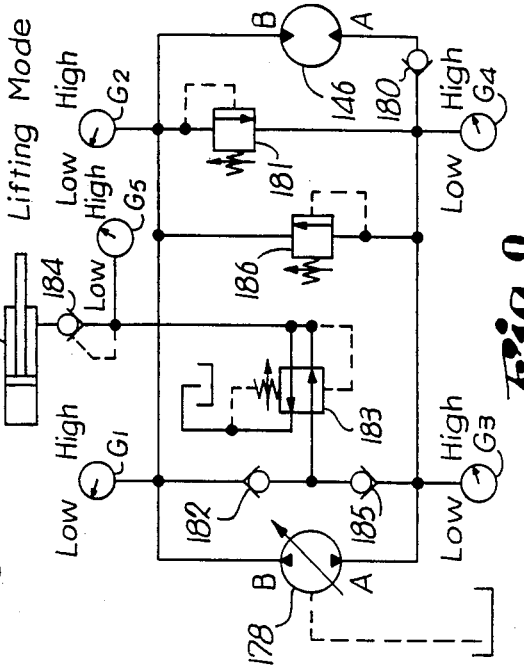
Figure 16:
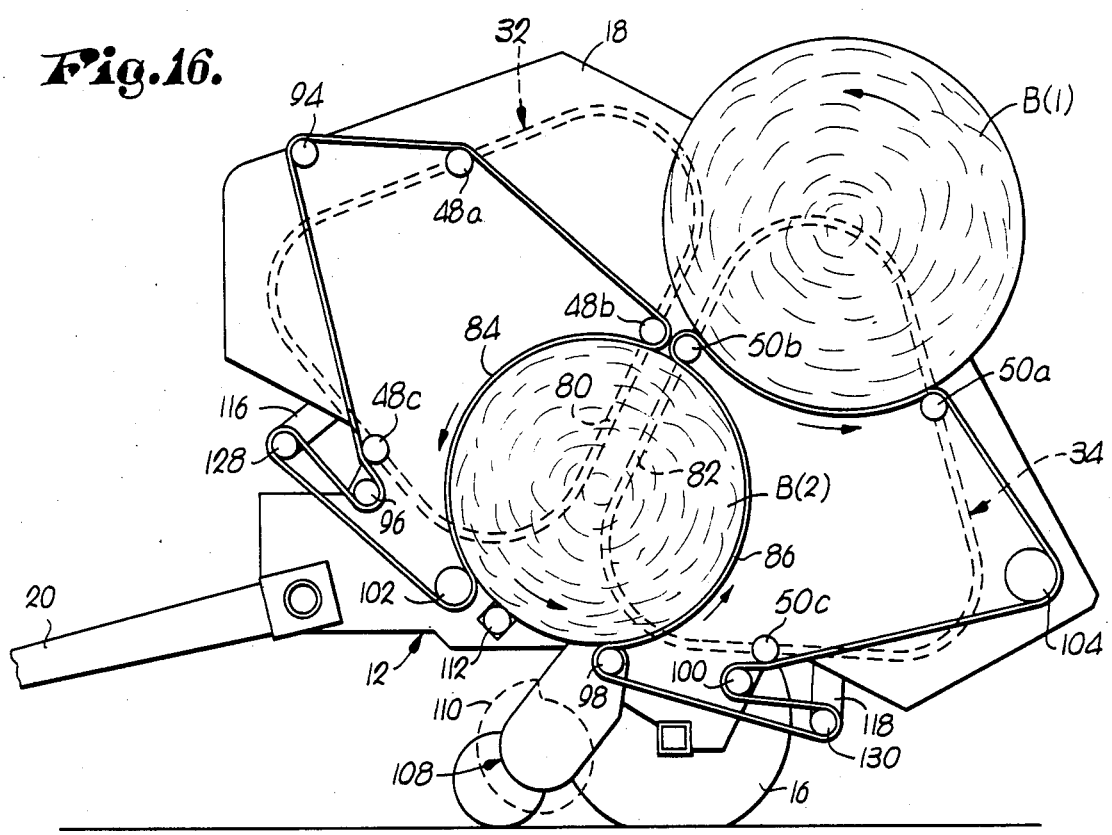

FIGS. 8 and 9 schematically illustrate a suggested hydraulic circuit for controlling the tensioning cylinders 120 and the hydraulic motor 146. During mere forming of a bale, it is necessary for the hydraulic circuit to apply compactive pressure through the cylinders 120, and it is desirable that such pressure be constant throughout the forming process. FIG. 8 illustrates the condition of things in the circuit during what will hereinafter be referred to as the "forming mode" of the circuit.

On the other hand, when a finished bale is being lifted to the bale wrapping position, it is necessary for the control circuit to apply lifting force to the next two positioning rollers 48, 50, while at the same time applying the same tension to the forming belts as before. In FIG. 9, the condition of things therein illustrated has been denoted as the "lifting mode".

The variable displacement pump 178 is mechanically linked to a control cam (not shown) secured to the shaft 52 associated with the front sprocket 36. Thus, the rotative position of the sprocket 36 determines the rotative position of the control cam, and hence also the position of the swash plate within the pump 178. This is significant because, depending upon the position of the swash plate, high pressure oil will be pumped by the pump 178 either along circuit path A—A or B—B toward the motor 146.

In the forming mode, high pressure oil is introduced by the pump 178 into circuit path B—B, as indicated by the two gauges G1 and G2. However, the motor 146 cannot be driven by the pressurized oil in path B—B because a check valve 180 adjacent to motor 146 in path A—A blocks the discharge of oil from motor 146 into path A—A. Accordingly, the high pressure oil in path B—B flows through a pilot-operated relief valve 181 to path A—A and returns to the pump 178. As indicated by gauges G3 and G4 in path A—A, the pressure level in path A—A at this time is relatively low.

It will be remembered, however, that even though the motor 146 is not to be driven hydraulically during the forming mode, it is important that the motor 146 be capable of "mechanical" rotation by the bale growing within the chamber 88. In this respect, since the bale continues to grow, it will push upwardly on the overhead rollers 48, 50, causing the chains 80, 82 to be moved, which in turn rotates the output shaft of the motor 146. Oil which is displaced by motor 146 during such rotation by the growing bale simply moves reversely in path B—B and over to path A—A via the relief valve 181.

It is important, of course, that belt tension be constantly applied to the forming bale when the circuit is in the forming mode, and this is accomplished by continuing to pressurize the cylinders 120 even though the motor 146 is not hydraulically driven at this time. In this respect, when the path B—B is subjected to high pressure oil by the pump 178, pressurized oil also flows through a check valve 182, thence through a pressure-reducing valve 183, and finally to the cylinders 120 via a pilot-operated check valve 184. As illustrated by the gauge G5 slightly upstream from the pilot-operated check valve 184, the pressure on the downstream side of the reducing valve 183 is something less than that in path B—B when the latter is fully pressurized. The reducing valve 183 actually serves to prevent the pressure seen by the cylinders 120 from exceeding a certain predetermined amount, regardless of the pressure level which may be reached in paths A—A or B—B. This can be important during discharge of a bale when, because of a change in belt length, the cylinder 120 may be caused to extend to take up belt slack, yet it is necessary that the actual pressure in the system and thus the force applied by the belts to the bale forming in chamber 88 not exceed the chosen level. Valve 183 has the ability to maintain the selected pressure level under those circumstances.

When the rollers 48a, 50a have been moved upwardly by the growing bale to such an extent that the bale is now full sized, the cam on shaft 52 will likewise have been rotated to such a position that it shifts the swash plate within the pump 178 into position for starting the lifting mode of the hydraulic circuit as illustrated in FIG. 9. When the swash plate is thus shifted, the pump 178 introduces high pressure oil into path A—A of the circuit, as indicated by the gauges G3 and G4 in FIG. 9. This time, the oil attempting to enter the motor 146 is permitted such entrance by the check valve 180, and consequently, the motor is driven in such a manner as to power the next positioning rollers 48b, 50b into position underneath the finished bale and up along the course of travel of such rollers to raise the bale toward the tying location.

Note during this operation of the motor 146 that high pressure oil in circuit path A—A continues to be presented to the pressure-reducing valve 183 through a check valve 185 in one of the lines bridging the two circuit paths A—A and B—B. Oil is preventing from short circuiting to the circuit path B—B at this time, however, because of the other check valve 182. Consequently, even throughout operation of the motor 146 to raise the finished bale, tension is maintained on the belts by the cylinders 120 since oil continues to be presented therethrough through the pressure-reducing valve 183 and the pilot-operated check valve 184. It is to be noted, however, that the pressure seen by the cylinders 120 is something less than that experienced in circuit path A—A, as illustrated by gauge G5 when compared to gauges G3 and G4. A pilot operated, pressure-relief valve 186 may be provided between the circuit paths A—A and B—B for the purpose of providing a safety relief for circuit A—A in the event that, for some unexpected reason, the motor 146 is jammed or otherwise prevented from rotating when circuit A—A is subject to high pressure.

Optional Flow-Separating Fork

FIGS. 17-21 are directed to additional structure which may be helpful in certain conditions to prevent freshly entering crop materials from tending to flow up to and become a part of the bale B(1) after such bale is raised from its normal lowered position and continues to rotate both during such initial raising and continued elevation and rotation during application of the wrapper. While the positioning rollers 48, 50 are operable to close together and form the top of the baling chamber 88 as they start upward along the center of the machine, there is still a tendency for materials to feed up between the rollers 48, 50 at this time, particularly in view of the inherent self-feeding action of the bale B(1) as it rotates counterclockwise and forms a feeding nip area at the point of its engagement with the roller 50.

Figure 18:
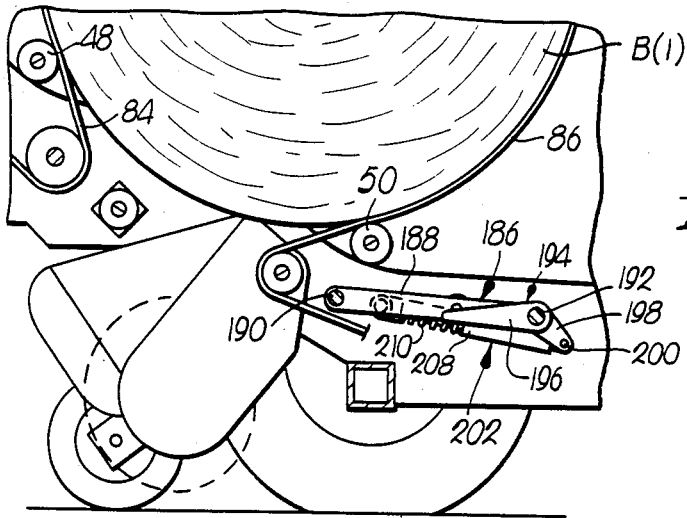
FIGS. 18 through 21 are fragmentary elevational views of the left side of the baler with the near sidewall removed to show details of a fork assembly which may be added to the baler to aid in separating incoming crop materials from a finished bale as it is raised to the wrapping station in the baler.

The separating fork is denoted broadly by the numeral 186 and is normally maintained in its stored or standby position of FIG. 18 wherein the fork 186 lies in a generally fore-and-aft attitude below and behind the baling chamber 88. The fork 186 includes a pair of arms 188 (only one being shown) situated on opposite inboard sides of the baler and fixed at inner ends to a shaft 190 spanning the baler and journalled at opposite ends by the sidewalls 18. At their outer ends, the arms 188 are provided with a cross shaft 192 which interconnects such opposite ends and forms a transverse pivot for the head 194 of the fork having a plurality of laterally spaced tines 196 which are aligned with the spaces between the rear set of belts 86 so as to be able to project forwardly through such spaces and between the belts during operation as hereinafter explained. A pair of cranks 198 (only one being shown) at opposite lateral ends of the head 194 are rigidly affixed thereto and project normally rearwardly therefrom to respective, pivotal connections 200 with spring-loaded, telescoping links 202 which are pivoted at their opposite ends to the corresponding sidewall 18 by pivots 204. Each of the telescoping links 202 includes a central rod 206 and an external sleeve 208 that can slidably reciprocate on the rod 206, there being a compression spring 210 coiled around the rod 206 between the lower end of the sleeve 208 and the pivot 204. Thus, each sleeve 208 is yieldably biased away from the pivot 204 to the extent permitted by an internal limit (not shown) to cause the link 202 to assume a maximum length condition illustrated in FIGS. 18, 19, and 20.

Figure 17:
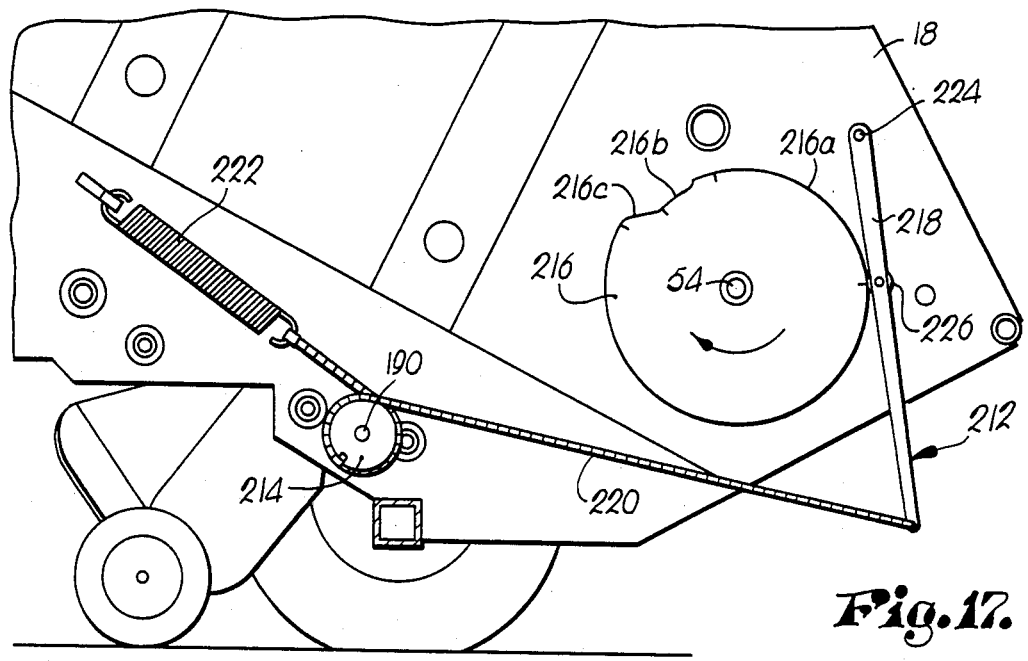
FIG. 17 is a fragmentary elevational view of the left side of the baler with the ground wheel removed to reveal details of a control for a fork assembly as depicted in FIGS. 18-21.

The fork 186 is operated by control apparatus broadly denoted by the numeral 212 illustrated in FIG. 17 on the left side of the baler. In this respect the shaft 190 upon which the arms 188 of fork 186 are mounted projects through the left side wall 18 of the baler and is rigidly secured to a suitable sprocket 214 for rotation of the sprocket 214 and shaft 190 as a unit.

Rotation of the sprocket 214 is, in turn, caused and controlled by remaining components of the apparatus 212 including a cam 216, cam follower lever 218, drive chain 220, and tension spring 222. The lever 218 has a pivotal connection 224 at its upper end with the sidewall 18 and is provided intermediate its opposite ends with a follower roller 226 that rides on the periphery of the cam 216. The chain 220 attached to the lower end of the lever 218 extends forwardly therefrom and wraps around the sprocket 214 for almost 360' of wrap, whereupon it connects at its opposite end with the tension spring 222 such that the follower roller 226 of lever 218 is constantly biased into engagement with the periphery of cam 216.

The cam 216 is fixed to the stub shaft 54 associated with the lower rear sprocket wheel 42 of positioning apparatus 30 such that cam 216 rotates with the sprocket 42 and is timed with the positioning mechanism 30. Much of the periphery of the cam 216 is concentric with the axis of shaft 54 such that there is no swinging movement of the lever 218 about pivot 224 and hence no movement of the fork 186 out of its stored position of FIG. 18. The stored position of the fork 186 in FIG. 18 corresponds to the condition of the cam 216 and position of the lever 218 as shown in FIG. 17. The operating link 202 of the fork 186 causes the head 194 thereof to be folded down into a retracted position at this time.

Figure 19:
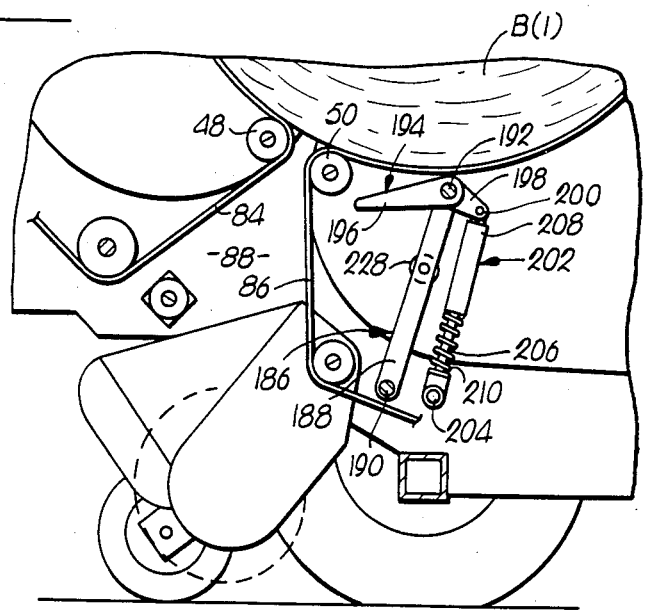

As the bale B(1) is lifted by the positioning rollers 48 and 50, caused by operation of the positioning mechanisms 28 and 30, the cam 216 is caused to rotate in a clockwise direction viewing FIG. 17 such that a peripheral segment 216a becomes presented to the lever 218. Because the segment 216a is of a progressively decreasing radius, the lever 218 is allowed to swing in a clockwise direction under the influence of the tension spring 222, causing the sprocket 214 to be rotated in a counterclockwise direction and thereby swing the fork 186 upwardly out of its stored position as illustrated in FIG. 19. Because the operating link 202 is at its full extension at this time, such swinging of the fork 186 causes the head 194 thereof to flip out in a clockwise direction from its folded or retracted position of FIG. 18.

Figure 20:
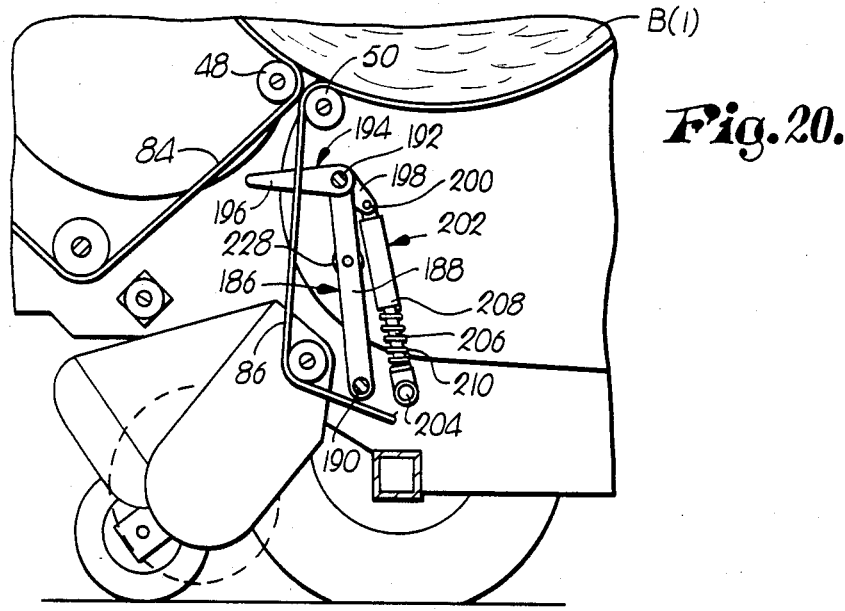
Figure 21:
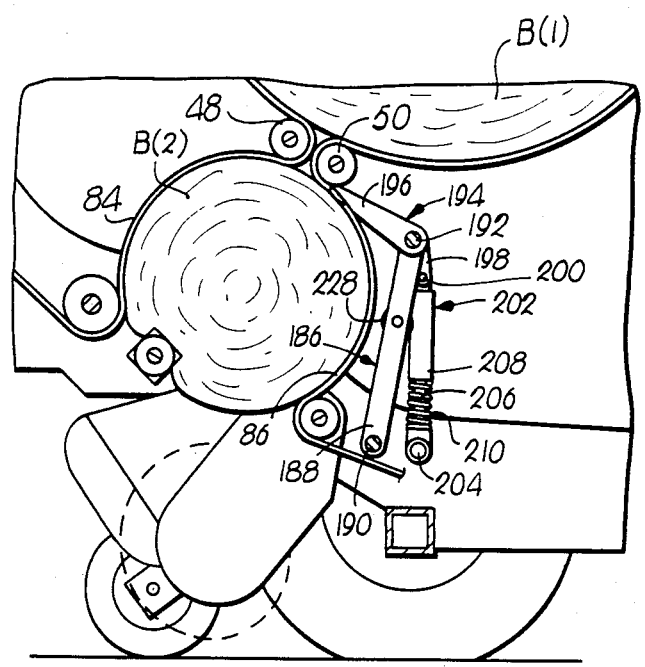

As the bale B(1) continues to rise within the baler, the fork 186 continues to swing toward the chamber 88 until the positioning rollers 48, 50 come together and close off the top of the new baling chamber 88 as shown in FIG. 20. By this time, a second peripheral segment 216b of cam 216 will have come under the follower 226 of lever 218, and because segment 216b is an abruptly radially reduced segment, the fork 186 will have moved ahead quickly into its operating position of FIG. 20 wherein the tines 196 project into and substantially across the chamber 88 a short distance below the rollers 48, 50. Such abrupt movement of the tines 196 into the chamber 188 has the effect of cutting through any flowing stream of material tending to move up between rollers 48, 50 to the overhead bale B(1) and to deflect such separated stream downwardly and forwardly toward the front of the chamber 88. Formation of the new bale core B(2) then commences within the chamber 88, and as the bale core B(2) grows, it bears against the tines 196 to deflect the same in a clockwise direction, compressing the springs 206 of telescoping links 202.

As the bale core B(2) grows even further, raising the rollers 48, 50, such movement of rollers 48, 50 by bale B(2) has the effect of also rotating the cam 216 through mechanisms 28, 30, causing a third peripheral segment 216c of cam 216 to come under the roller 226 of lever 218. Segment 216c is a segment of rapidly increasing radius so that lever 218 is swung in a counterclockwise direction to likewise swing the fork 186 in a counterclockwise direction away from the bale B(2) and back down toward, and ultimately to, its stored position of FIG. 18. Rollers 228 on the arms 188 of fork 186 are disposed for riding engagement with the bale B(2) as the latter grows and the fork 186 is raised up into its operating position such that growth of the bale will also have a tendency to swing the fork 186 back out of the chamber 88 when presence of the fork 186 is no longer needed.

Embodiment of FIGS. 22-30

The continuous baler of FIGS. 22-30 is substantially identical in principle with the baler of FIGS. 1-21, except that certain improvements are presented which provide improved bale quality and more trouble-free operation. In view of the substantial similarities involved between the two embodiments, the embodiment of FIGS. 22-30 will only be briefly described.

Figure 23:
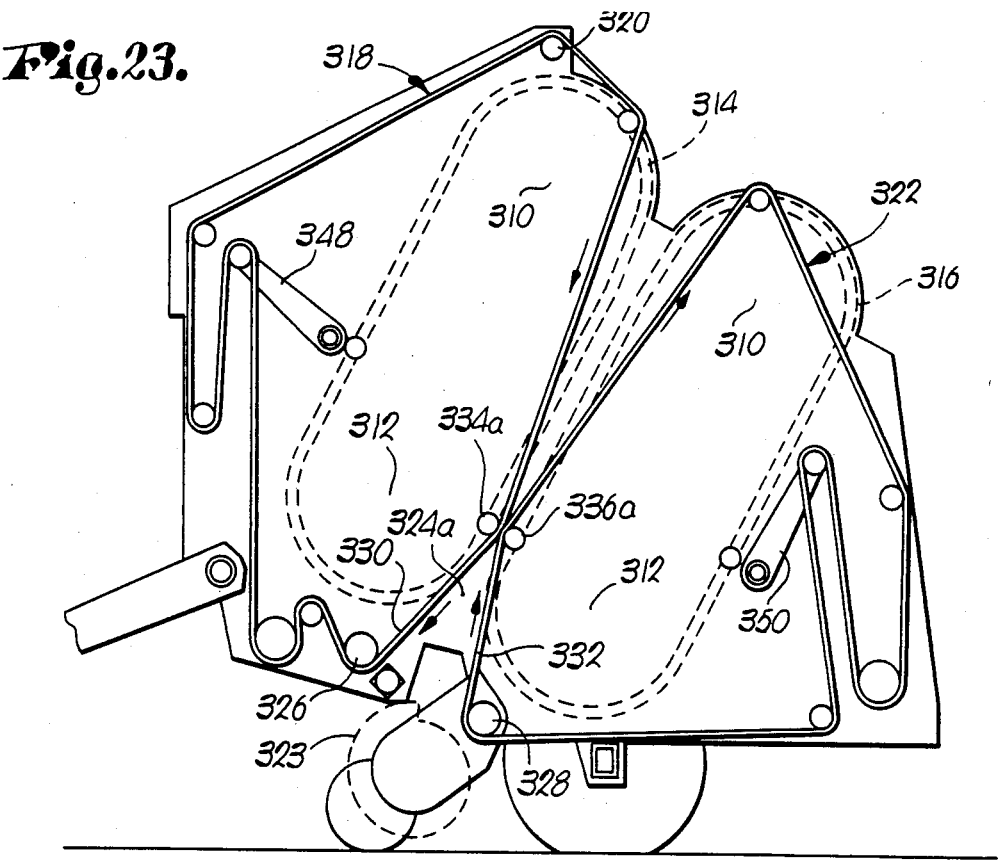

A primary distinction between the two balers resides in the differences in the configurations of the paths of travel followed by the positioning rollers for the forming belts. While it will be seen that the paths of travel of the positioning rollers in the first embodiment are generally triangular in nature, the paths of travel of the corresponding rollers in the second embodiment are generally elliptical but with rectilinear side stretches instead of arcuate side stretches as in a true ellipse. In this respect, instead of three guide sprockets for each conveying chain of the rollers, the second embodiment utilizes only a pair of such sprockets having their axes of rotation at points 310 and 312 as illustrated in FIG. 23. Consequently, the positioning chains 314 and 316 for the front and rear groups of guide rollers respectively move in the generally elliptical patterns illustrated by the dashed lines in FIGS. 23-30, which have longer rectilinear stretches along their common course of travel than in the first embodiment.

Furthermore, the front set of belts 318 in the second embodiment have a stationary apex presented by the stationary roller 320 that is substantially higher than the corresponding apex of the rear belts 322 at their highest point of travel which, rather than being stationary, is continuously moving. As will be seen from the operation hereinafter described, this provides a sort of backstop or barrier that prevents a fully formed and wrapped bale from sitting atop the belts when its baling cycle is completed and gives such bale extra encouragement to roll down the discharge ramp of the baler and onto the ground. This condition is illustrated, for example, in FIG. 29.

Figure 22:
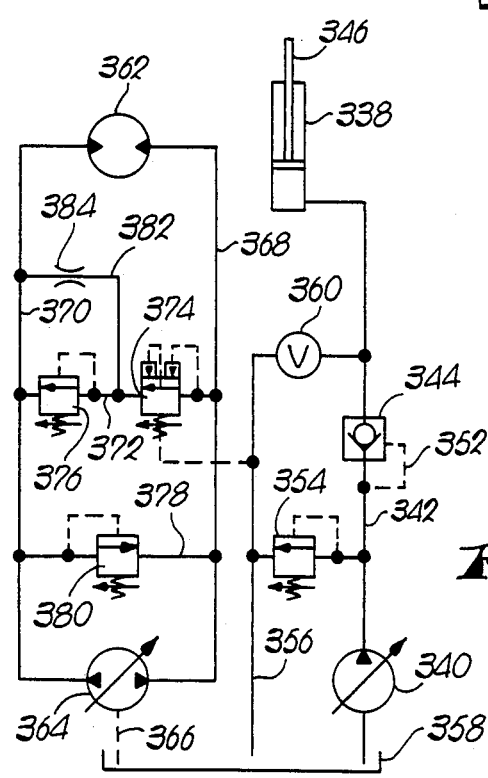
FIG. 22 is a schematic illustration of the hydraulic circuit and control components with respect to a second embodiment of the invention.

A different hydraulic control system for the positioning rollers has also been provided for the second embodiment so that the rollers may be utilized to eject a completely wrapped bale from the baler at an earlier point in formation of the next succeeding bale than was the case with the first embodiment. Thus, the finished and wrapped bale is not subjected to continued rolling and abrasion by the belts within the baler beyond that period of time which is absolutely necessary. This new action of the positioning rollers is illustrated, for example, in FIGS. 29 and 30. The new hydraulic control circuitry capable of carrying out such control and operation of the positioning rollers is illustrated in FIG. 22.

Operation of the Second Embodiment

Figure 24:
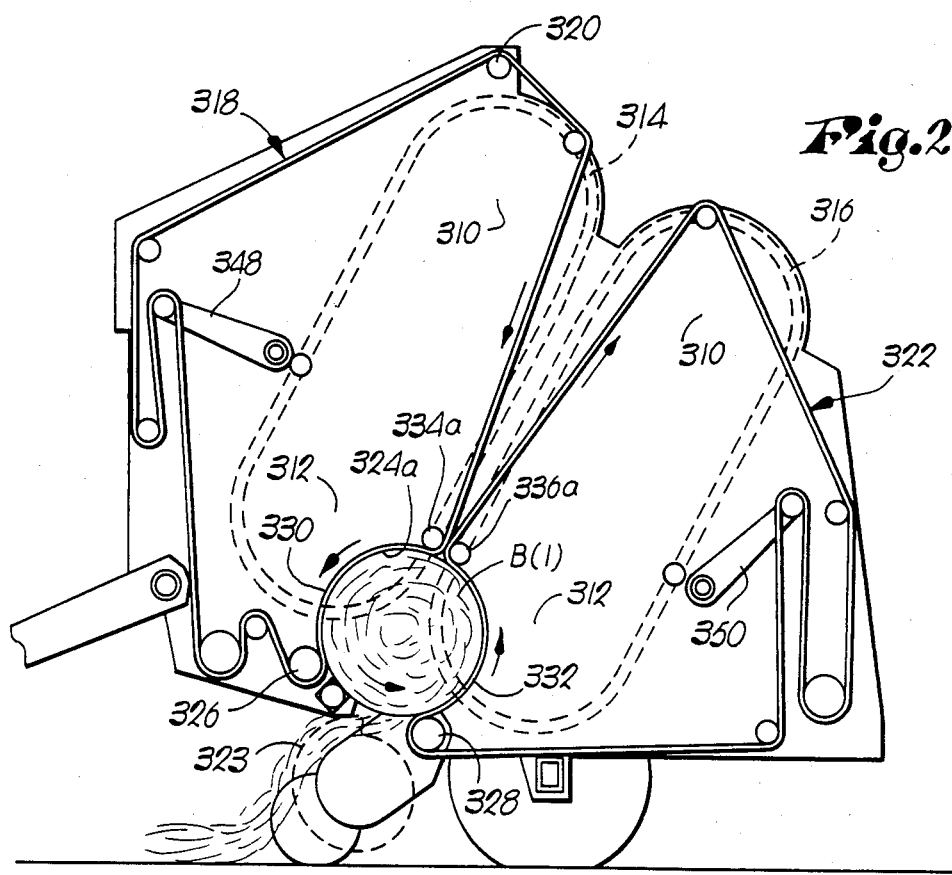

As the baler of the second embodiment moves across the field as illustrated in FIG. 23, the pickup 323 continuously lifts windrowed materials off the ground and introduces them into the baling chamber 324 through the bottom entrance to such chamber defined between the fore-and-aft spaced apart belt guide members 326 and 328. The newly introduced material is acted upon by the oppositely moving belt stretches 330 and 332 in the same manner as in the first embodiment such that a bale begins to form within the chamber 324 as illustrated in FIG. 24. The positioning rollers 334a and 336a yieldably resist upward movement at this time to provide down pressure against the forming bale.

Figure 25:
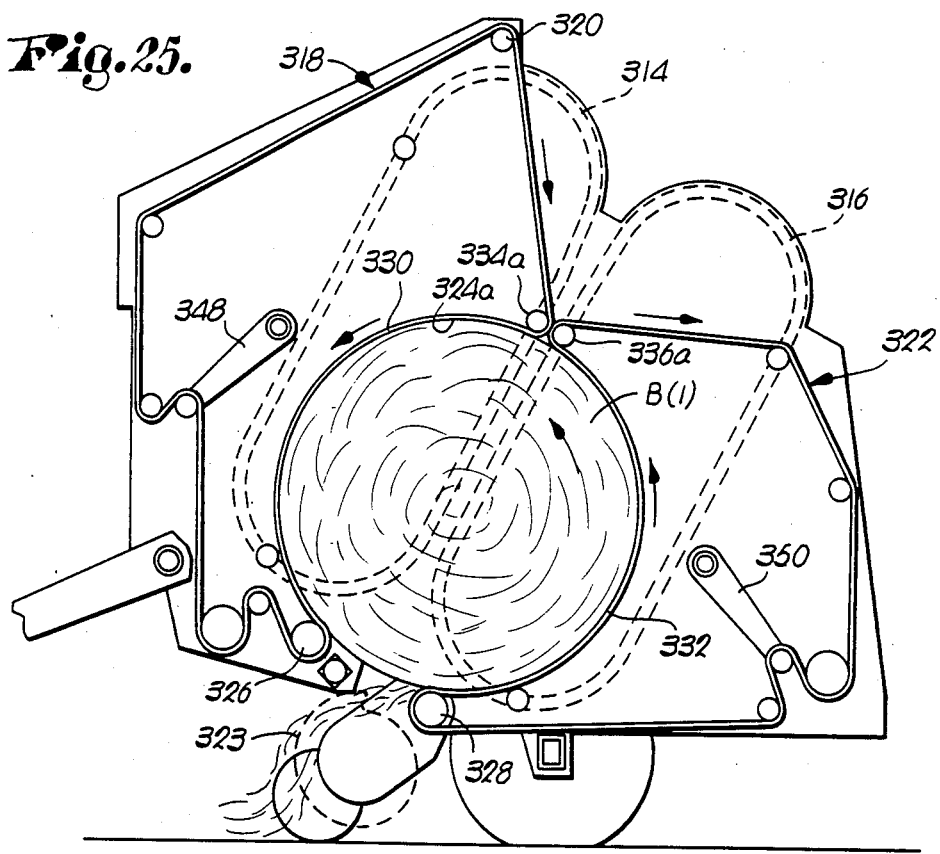

This action continues until the bale B(1) reaches the full size diameter illustrated in FIG. 25. At that point in time, or slightly thereafter as the bale is raised to the position illustrated in FIG. 26 and the two upper positioning rolls 334a and 336a start to separate, a suitable binding twine other wrapping material may be inserted down into the baling chamber between the rollers 334a and 336a to engage the bale and be coiled around the same as the bale continues to be rotated within the chamber. The specific dispensing apparatus for the twine or other wrapper may take a variety of forms and is preferably positioned in the same location as the dispenser 179 of the first embodiment illustrated in FIG. 1.

Figure 26:
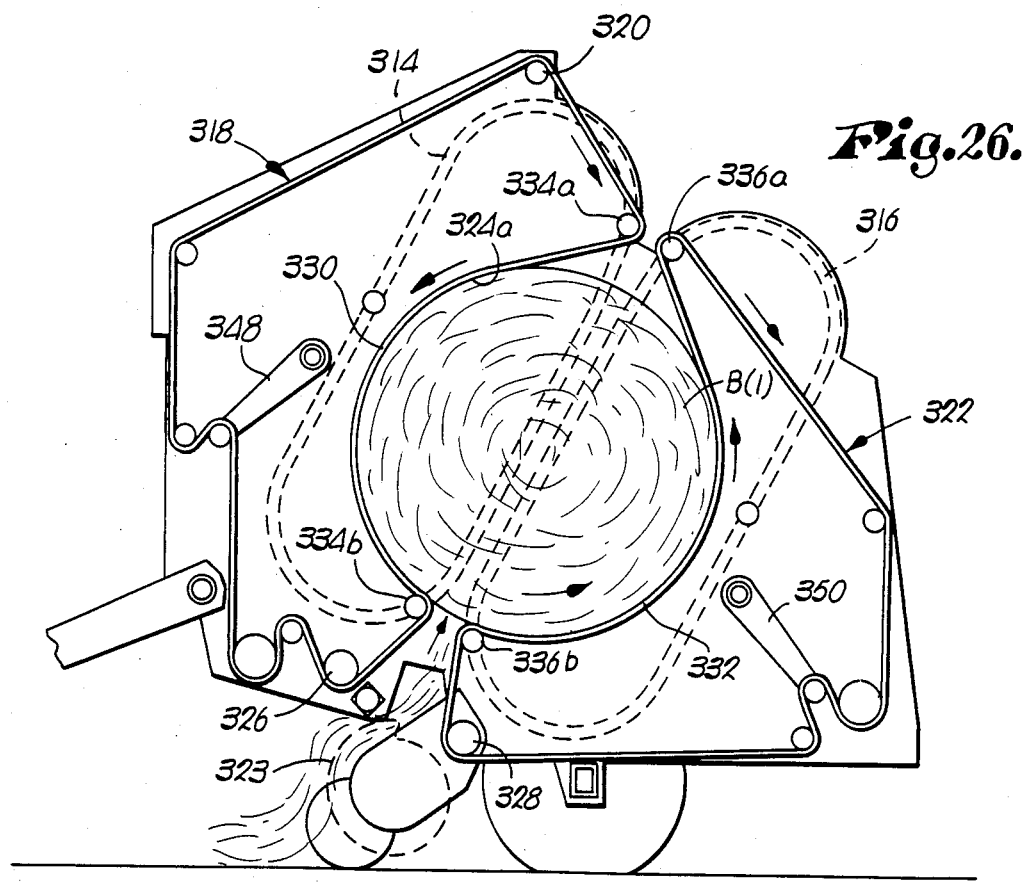

Essentially simultaneously with the start of bale wrapping, or slightly therebefore, the positioning chains 314 and 316 are operated to cause the next pair of positioning rollers 334b and 336b to start moving under the bale B(1) as illustrated in FIG. 26 such that the bale B(1) is caused to be lifted a short distance upwardly out of its initial lowered location within the baler. It is to be noted that the bale B(1) does not leave its baling chamber at this time; instead, the incoming positioning rollers 334b and 336b simply close off the previously opened lower entrance end of the chamber so that both the bale B(1) and its chamber are displaced upwardly along the course of travel of the contiguous portions of the positioning chains 314 and 316. As mentioned above, such initial upward movement of the positioning rollers 334b and 336b also has the effect of moving the rollers 334a and 336a upwardly away from the bale B(1) and slightly away from one another as they commence movement about the upper arcuate ends of their respective closed loops of travel.

When the rollers 334b and 336b complete their movement toward one another as illustrated in FIG. 27, a new baling chamber 324b is presented at the old location of baling chamber 324a and with the same configuration. Rollers 334b and 336b thus not only serve as this time to close off the bottom of the baling chamber 324a in which the bale B(1) is located, but also to close off the top of the newly formed baling chamber 324b. Thus, the new baling chamber 324b is ready to commence formation of the next succeeding bale, using the coacting countermoving belt stretches 330 and 332 in the same manner as was true with respect to bale B(1).

Of course, during the time that bale B(1) is being raised between the positions of FIG. 25 and FIG. 27, fresh crop material continues to enter the baler beneath the bale B(1). Movement of the rollers 334b and 336b into their close proximal positions as illustrated in FIG. 27, is fairly swift, discouraging the continued delivery of freshly incoming materials to the bale B(1) by the upwardly moving rear belt stretch 332. Additionally, the flow separating fork 186 of the first embodiment may be utilized to assist in separating the bale B(1) from incoming crop material, if desired.

It is important to note that, as illustrated in FIG. 27, and continuing on into the condition of things illustrated in FIG. 28, the belt stretches 330 and 332 of the upper chamber 324a wrap the bale B(1) throughout almost its entire periphery during the time that the wrapping is being applied. Such essentially total envelopment of the bale B(1) by the upper belt stretches 330 and 332 helps keep the peripheral finish of the bale smooth and compacted until the bale B(1) can be completely wrapped with wrapping material. Without such complete envelopment of the bale, it has been found that there is some tendency for the periphery of the bale to be sloughed off as the bale continues to rotate and prior to covering or binding of the exposed portion with the wrapping material.

As the new bale B(2) begins to form, as illustrated in FIG. 28, the rollers 334b and 336b yieldably resist upward movement so as to apply compactive downpressure to the forming bale B(2). By the time the bale B(2) reaches the size illustrated in FIG. 29, the first bale B(1) will have been completely wrapped and ready for discharge. Accordingly, rather than continue to carry the bale B(1) within the baler until it is simply forced out by the growing new bale B(2), the positioning chains 314 and 316 are actuated to move the positioning Q rollers 334a and 336a upwardly away from bale B(2) so as to lift the bale B(1) to the discharge position. There, the rear belts 322 become formed into a downwardly and rearwardly inclined ramp which encourages the bale B(1) to simply roll out of the baler by gravity in a downward and rearward direction. Because the front belts 318 are held upwardly by the stationary roller 320 at this time, the stretch of the front belt 318 between stationary roller 320 and positioning roller 334a serves as a backstop to prevent the bale B(1) from settling in place on top of the rollers 334a and 336a. Thus, the bale B(1) is further encouraged to roll out of the baler.

Figure 29:
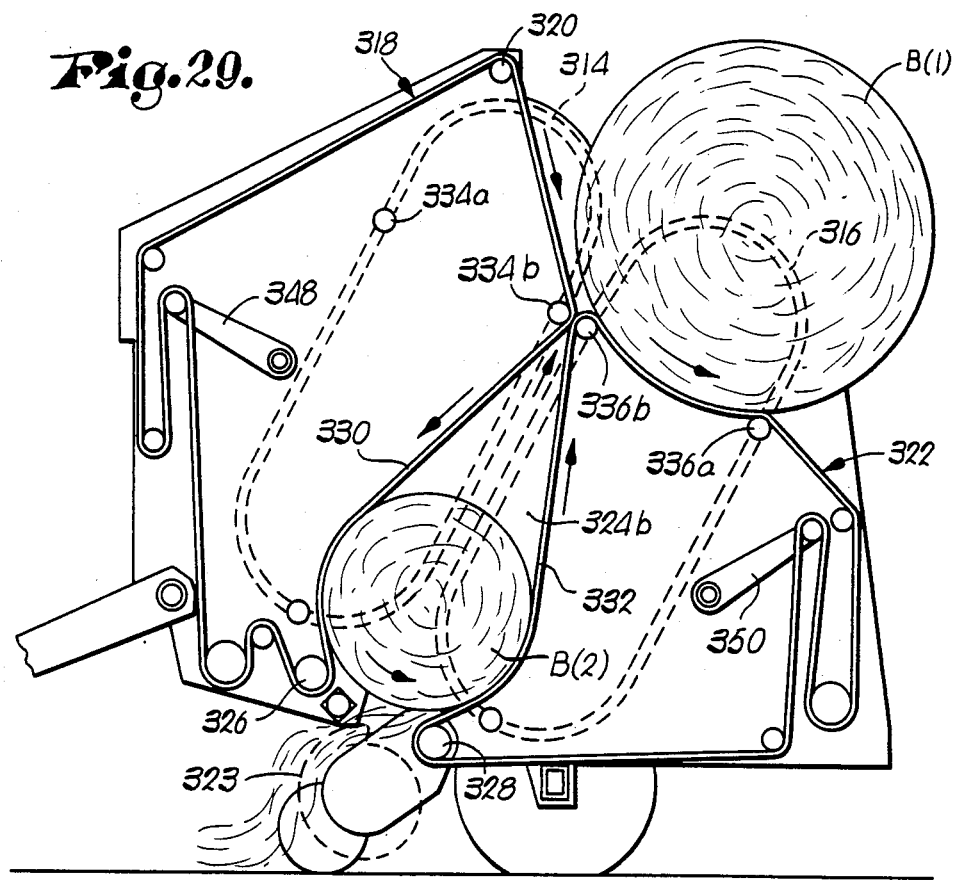
Figure 30:
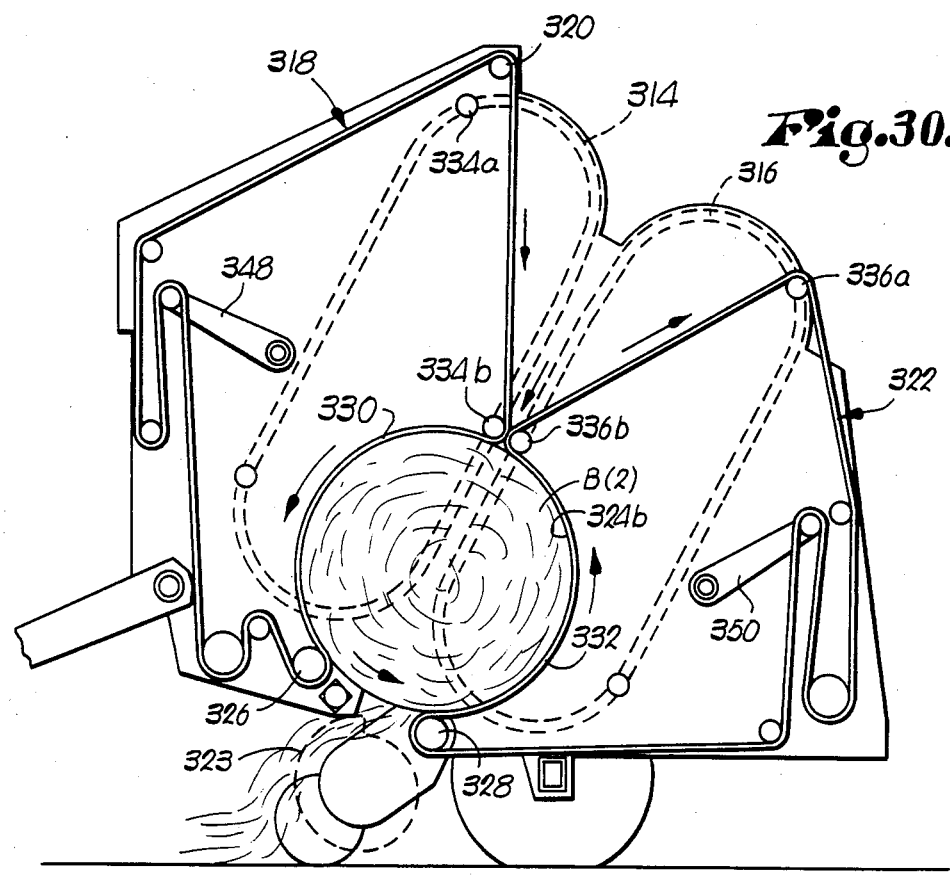
Figure 33:
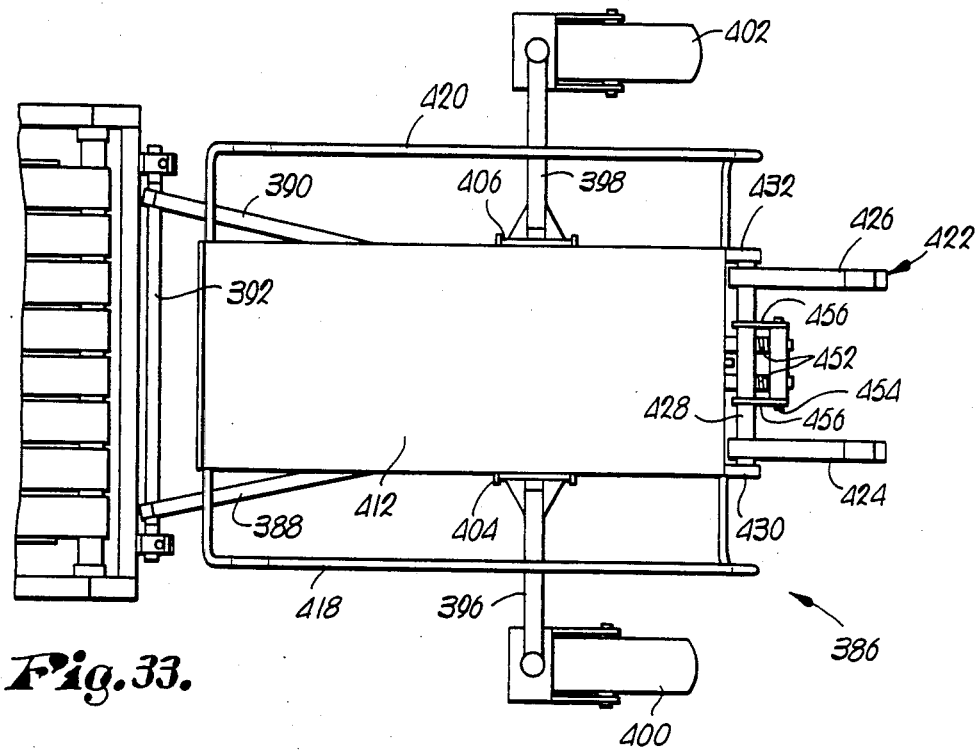
FIG. 33 is a fragmentary top plan view of the baler and its accumulating trailer.

As soon as the bale B(1) is discharged, the positioning chains 314 and 316 are operated in a direction to bring the guide rollers 334a and 336a back down against the top of the bale B(2), as illustrated in FIG. 30. Although the top of the bale B(2) is thus not tightly wrapped by the belts for a short period of time during ejection of the previous bale as illustrated in FIG. 29, such limited exposure has not been found harmful to the overall bale quality, particularly considering the fact that such exposure of the bale B(2) occurs during mid-cycle of the baling operation rather than at the end of the cycle; the compactive force from overhead rollers 334a and 336a is reapplied shortly after removal so that any loose material is securely packed back into the bale B(2) in preparation for further growth of the bale.

Thereafter, formation of the bale B(2) continues in the same manner as the bale B(1), until the full size condition is reached, whereupon the cycle is repeated.

Hydraulic Control Circuit of the Second Embodiment

As with the first embodiment, the baler of the second embodiment requires hydraulic control of its tensioning cylinders for the belts 318 and 322 (see the tension cylinders 120 of the first embodiment) and of the positioning chains 314, 316. The tensioning cylinders require constant hydraulic pressure throughout the entirety of each baling cycle, while the positioning chains 314, 316 require yieldable hydraulic pressure in one direction during bale formation and greater hydraulic pressure in the opposite direction during bale lifting and ejection. Whereas the first embodiment employed a single variable displacement pump with both the tensioning cylinders and the hydraulic motor for the positioning chains connected in the same circuit with the single pump, the second embodiment utilizes a more simplified arrangement having a pair of hydraulic pumps with essentially separate circuits for the tensioning cylinders and the hydraulic motor. In this regard, it will be seen from FIG. 22 that the tensioning cylinder 338 is coupled with a variable displacement pump 340 via a supply line 342. A pilot operated check valve 344 is provided in line 342 so as to allow the admittance of pressurized fluid into the tensioning cylinder 338 from pump 340 but to prevent the escape of such fluid from cylinder 338 along line 342 when the pump 340 is turned off. Thus, pressure is held in tensioning cylinders constantly, not only throughout the baling cycle, but also when the pump 340 is turned off at the end of a day's operation.

It will be appreciated that as the bale grows within the baler, the piston 346 of cylinder 338 is progressively pushed into a more retracted condition within cylinder 338 by the belts 318 and 322 which must obtain progressively increasing amounts of "slack" from the slack takeup arms 348 and 350 as the peripheral dimension of the bale increases. Accordingly, oil must be allowed to escape from the cylinder 338 without decreasing the pressure level in the circuit. Such is accomplished by virtue of the pilot line 352 interconnecting circuit line 342 and the check valve 344 which causes the check valve 344 to be open any time the pump 340 is operating. Thus, pressure can be maintained throughout line 342 and within the cylinder 338, even though some oil must be forced out of cylinder 338 by the retracting piston 346, back through open check valve 344 and over the relief valve 354 which connects high pressure line 342 with a drain line 356 leading to tank 358. A normally closed drain valve 360 in drain line 356 above the check valve 344 permits oil to be completely drained from the tension cylinders 338 if desired, after the pump 340 has been turned off.

The reversable hydraulic motor 362 is coupled with the positioning chains 314 and 316 and is driven in either a clockwise or counterclockwise direction, depending upon the particular point in the baling cycle under consideration, by a second variable displacement pump 364. The pump 364 is connected to the tank 358 for oil supply purposes via a supply line 366 and is maintained in a closed loop relationship with the reversable motor 362 via lines 368 and 370.

During bale formation, the positioning chains 314,316 are driven yieldably downwardly along their proximal stretches by the motor 362 so as to apply compactive pressure to the forming bale. The pump 364 is supplying oil to the motor 362 along line 368 at such time, attempting to drive the motor 362 in a direction to move the chains downwardly. However, the growing bale causes the chains to be moved upwardly so that the motor 362 is actually rotated in a reverse direction from that attempted by oil in the line 368, and the oil is allowed to make a closed loop through the motor 362 via line 368, a bypass line 372 interconnecting lines 368 and 370 above pump 364, a "kick down" valve 374 (hereinafter described in detail) in bypass line 372, a relief valve 376 in bypass line 372 (controlled by kick down valve 374), and the upper portion of line 370. The setting of adjustable relief valve 376 determines the amount of resistive pressure present in line 368 and against which the motor 362 reversely rotates as the bale grows within the baling chamber.

When the bale reaches full size, an operating cam coupled with the pump 364 but not illustrated herein reverses the direction of flow of the pump 364 so that high pressure oil now flows into line 370 from the pump 364 and line 368 becomes a return line. This provides the motor 362 with power to drive the positioning chains 314,316 in an upward direction along their proximal stretches such that the finished bale is lifted by the underlying positioning rollers 334,336 as previously described. A bypass line 378 interconnecting lines 368 and 370 below bypass line 372 is provided with an adjustable relief valve 380 whose setting determines whether high pressure oil in line 370 will actually drive the motor 362 in a bale lifting direction or be bypassed back to the pump 364 in a loop consisting of the line 370, bypass line 378, relief valve 380, and line 368. It will be appreciated that the unillustrated cam coupled with the pump 364 determines those points in the operating cycle of the baler when the positioning rollers 334,336 apply compactive down pressure to the forming bale, when they lift the formed bale and its chamber to a slightly raised position for wrapping, and when they lift the completely wrapped bale up and out of the baler for discharge.

When the bale is being lifted for discharge purposes, high pressure oil is flowing through the line 370 to motor 362 as previously described. The culmination of such action is illustrated in FIG. 29 wherein the rollers 334a and 336a are in their temporarily raised, bale discharging positions. The operating cam thereafter reverses the flow out of pump 364 so that line 368 becomes the high pressure line, driving motor 362 in the reverse direction to bring the rollers 334a and 336a back down against the top of the bale B(2) as illustrated in FIG. 30. When the rollers 334a and 336a engage the top of the bale B(2), back pressure within the line 368 is increased to such a level that the kick down valve 374 is opened, allowing oil to be by-passed through line 372 and relief valve 376 in the previously described manner. Thereafter, although pump 364 continues to attempt to deliver oil to the motor 362 via line 368, the motor 362 is rotated reversely against the pressure in line 368 by the upwardly growing bale as previously explained.

The kick down valve 374 is of such design that it opens line 372 to relief valve 376 at a relatively high pressure, and once so opened, remains open so long as it has at least some flow passing therethrough, even if such flow is at a relatively low pressure as is the case during yieldable retarding of the bale growth by the positioning rollers 334 and 336. It is possible, however, that the pressure in bypass line 372 may sometimes temporarily fall below that required to open relief valve 376 during the application of retarding pressure by rollers 334 and 336, thus stopping flow through the kick down valve 374 and allowing it to reclose. To prevent this from happening, a line 382 connects with bypass line 372 between kick down valve 374 and relief valve 376 and leads to line 370 on the upstream side of the motor 362 when the latter is being reversely rotated by the growing bale. Line 382 is provided with a restricted orifice 384 which is always open to provide flow through kick down valve 374, even though relief valve 376 may be closed due to the pressure in bypass line 372 being lower than the relief setting of relief valve 376. The presence of restricted orifice 384 in line 382 assures that, under normal circumstances, bypassing oil does not have a constantly available zero pressure escape through line 382 to line 370, but instead can only escape at a high volume rate through relief valve 376 when pressure in bypass line 372 exceeds the relief setting of relief valve 376.

The kick down valve 374 is of such design that it resets for closing bypass line 372 whenever pressure in the bypass line 372 drops to zero, i.e., when the circuit changes from its down-pressure-applying forming mode to its lifting mode in which line 370 becomes the high pressure line. A suitable kick down valve to perform the desired function of kick down valve 374 may be obtained from Sun Hydraulics Corporation of Sarasota, Fla., under the model designation "SQDB-FAN".

Accumulating Trailer Aspects

FIGS. 31–34 illustrate the way in which either of the continuous balers of the two previously described embodiments may be provided with an accumulating trailer so that the operator may dump groups of the finished bales at preselected locations instead of having them scattered throughout the field. For the sake of convenience, the accumulating trailer has been illustrated in connection with the embodiment of FIGS. 22-30.

The trailer 386 includes a pair of laterally spaced apart, fore-and-aft extending beams 388 and 390 that serve as part of the chassis of the trailer and diverge forwardly to points of hitching connection with a transverse hitch bar 392 (FIGS. 31 and 33) on the rear of the baler. The connections of the beams 388 and 390 with hitch bar 392 are such that trailer 386 can swing up and down relative to the baler about a transverse axis through hitch bar 92 but cannot swing from side to side relative to the baler.

The beams 388 and 390 converge rearwardly to fixed connections with a cross tube 394 (FIG. 34) also forming a part of the chassis. At its opposite ends, the cross tube 394 is connected with a pair of laterally outwardly oppositely extending outrigger beams 396 and 398 that, in turn, support a pair of caster wheels 400 and 402 at their outer ends. The outrigger beams 396 and 398 have respective fore-and-aft pivotal connections 404 and 406 with the opposite ends of cross tube 394 so that outrigger beams 396 and 398 can swing up and down relative to the cross tube 394 about pivots 404 and 406. A transverse stabilizing bar 408 (FIG. 34) extends beneath the cross tube 394 and is pivotally connected at its opposite ends with a pair of depending, rigid members 410 (only one being shown) which are rigidly affixed at their upper ends to corresponding ones of the outrigger beams 396 and 398. Thus, the caster wheels 400, 402 are effectively tied together in a four bar linkage to swing in union and in parallel with one another about pivots 404 and 406 when such motion is necessary to accommodate changes in ground contour.

Figure 32:
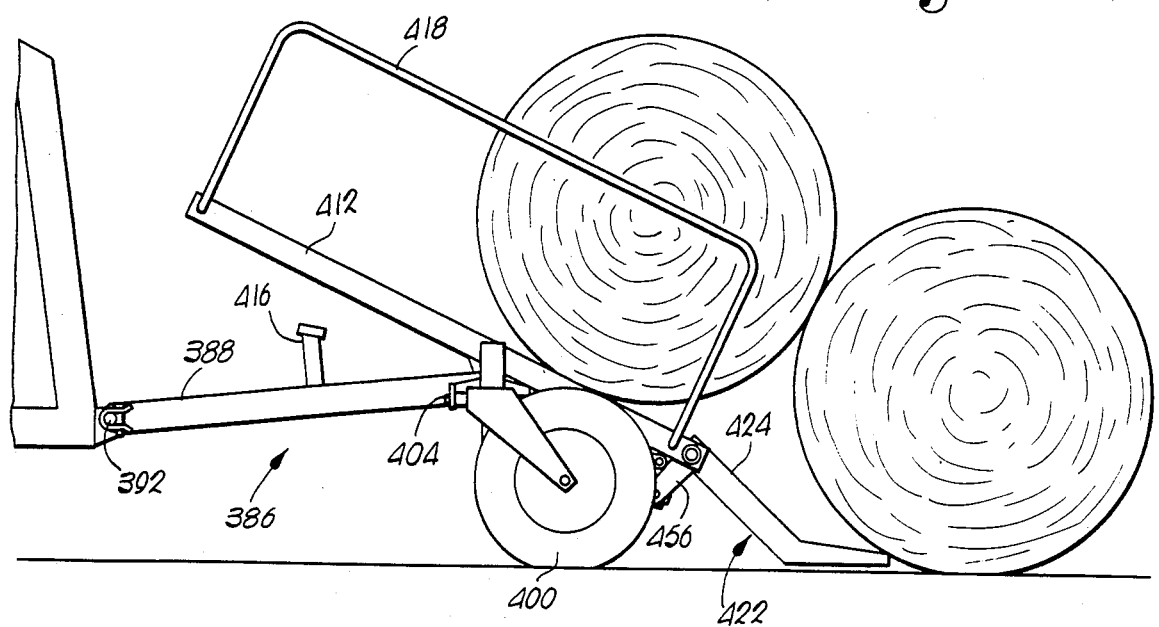
FIG. 32 is a fragmentary, side elevational view of the baler and accumulating trailer of FIG. 1 with the trailer illustrated in its dump position for unloading bales therefrom.

The trailer 386 further includes a bale receiving and transporting bed 412 that is swingably attached to the cross tube 394 by depending lugs 414 (FIG. 34) so that the bed 412 may be swung between a normal receiving position as illustrated in FIG. 31 in which the bed is slightly downwardly and rearwardly inclined and a dump position, as illustrated in FIG. 32, in which the bed is more steeply inclined downwardly and rearwardly. In the receiving position of FIG. 31, the bed rests upon a brace 416. A pair of side rails 418 and 420 project outwardly and upwardly from opposite sides of the bed 412 along the full length thereof to confine bales laterally as they are received on and transported by the bed 412.

The trailer 386 is provided with selectively releasable retainer means in the form of a tailgate 422 at the rear of bed 412 for holding collected bales against premature discharge from the bed 412. The tailgate 422 includes a pair of generally L-shaped arms 424 and 426 that are fixed to opposite ends of a torque tube 428 which, itself, is attached for rotation about its longitudinal axis to a pair of projecting ears 430 and 432 at the rear of the bed 412. Thus, the tailgate 422 is rendered swingable about the axis of torque tube 428 between a generally upstanding, closed position blocking gravitation of the bale from the bed 412 (FIG. 31) and a downwardly and rearwardly inclined, released position permitting gravitational discharge of the bales off the bed and down the tailgate (FIG. 32).

Power means broadly denoted by the numeral 434 is operably coupled with the bed 412 and the tailgate 422 for moving those structures between their alternate positions as above described. It will be noted in this respect that the position of the tailgate 422 is coordinated with the position of the bed 412 so that, when the bed 412 is in its normal receiving position of FIG. 31, the tailgate 422 is in its closed or blocking position, and when the bed 412 is tilted to its dump position of FIG. 32, the tailgate 422 is likewise in its released position for bale discharge.

Such power means 434 includes a fluid pressure piston and cylinder unit 436 pivotally connected at one end to a depending lug 438 at the rear of the bed 412 and at its other end to a curved link 440 which is connected at its upper end through a transverse pivot 442 to the rear end of a stationary lug 444 fixed to the cross tube 394. A connecting link 446 is pivotally joined at one end by a transverse pivot 448 with the hydraulic unit 436 and curved link 440 and is pivotally connected at its opposite end by pivot 450 to the bed 412 at a location spaced forwardly from the connection of hydraulic unit 436 to the bed 412 at lug 438. A pair of parallel, fore-and-aft extending push-pull links 452 are joined at their forward ends with the hydraulic unit 436, curved link 440 and connecting link 446 by pivot 448 and are pivotally connected at their rear ends by a pivot assembly 454 to the lower ends of a pair of corresponding cranks 456 fixed to the torque tube 428 at spaced apart locations along the length of the latter.

It should be apparent from the foregoing that with the bed 412 in its receiving position and the tailgate 422 raised to its closed position, the trailer 386 is disposed for receiving bales from the discharge ramp of the baler as illustrated in FIG. 31. As successive bales are emitted from the baler through the top of the latter, they roll down the ramp and directly onto the front end of bed 412, thereafter rolling along the bed 412 to the extent permitted by the closed tailgate 422 or a previously accumulated bale as the case may be.

When it is time to dump the accumulated load of bales (in this case the trailer is designed for only two bales, but there could be more), such may be carried out on-the-go with out interrupting the ongoing baling operations of the baler itself by simply actuating the hydraulic unit 436 to swing the bed 412 to its dumping position as illustrated in FIG. 32 and the tailgate 422 to its released position as illustrated in that same figure. The accumulated bales will thereupon simply roll down out of the trailer, utilizing the tailgate 422 as an assisting ramp, and onto the ground for subsequent transport or other handling. Reversing the hydraulic unit 436 causes the bed 412 to return to its receiving position and the tailgate 422 to its closed position, thereby once again disposing the trailer for reception of bales from the baler.

It is to be noted that the trailer 386 takes advantage of the fact that bales are ejected from the baler through the top of the baler rather than through a rearwardly opening tailgate at a relatively low location in the baler. Consequently, the trailer 386 can be close-coupled with the baler without interfering with the action of a rearwardly opening tailgate and can be placed in perfect position for intercepting bales as they roll down the elevated ramp of the baler.

It is thought that the present invention and many of its attendant advantages will be understood from the foregoing description and it will be apparent that various changes may be made in the form, construction and arrangement of the parts thereof without departing from the spirit and scope of the invention or sacrificing all of its material advantages, the form hereinbefore described being merely a preferred or exemplary embodiment thereof.

We claim:

1. Harvesting apparatus for use in the continuous packaging of crop materials into round bales, said apparatus comprising:

a baler capable of continuous advancement across a field while round bales are prepared in the baler and successively discharged therefrom, said baler having a bale forming chamber at a lower location in the baler and a finished bale discharge area at an upper location in the baler above said forming chamber, said baler further being provided with means for permitting the gravitational discharge of a finished bale from the discharge area toward the ground; and an accumulating trailer coupled with said baler in trailing relationship to the latter in disposition for receiving gravitationally discharged bales from the baler and temporarily accumulating a number of such bales before discharging the accumulated bales at a preselected location on the ground, said trailer including selectively releasable retainer means operable when released to discharge the accumulated bales onto the ground.

2. Harvesting apparatus as claimed in claim 1, said gravitational discharge means including structure on the baler comprising a discharge ramp directed toward said trailer.

3. Harvesting apparatus as claimed in claim 2, wherein said baler includes a pair of laterally spaced apart, opposite sidewalls, a plurality of transverse guide rollers spanning said sidewalls, and flexible web means entrained about said guide rollers in a manner to compactively engage and drivingly roll the bales during formation within the baler, said web means and said rollers being disposed to define said structure comprising a discharge ramp directed toward said trailer.

4. Harvesting apparatus as claimed in claim 3, said trailer including an elongated, downwardly and rearwardly inclined bed positioned to gravitationally receive discharging bales from the ramp of the baler at a normally front end of the bed and to permit the received bales to roll to a normally rear, discharge end of the bed, said retaining means being located at said rear discharge end of the bed.

5. Harvesting apparatus as claimed in claim 4, said retaining means comprising a tailgate swingable between a generally upstanding, closed position blocking further gravitation of the bales from the bed and a downwardly and rearwardly inclined, released position permitting gravitational discharge of the bales off the rear end of the bed and down the tailgate.

6. Harvesting apparatus as claimed in claim 5, said bed being provided with means for tilting the bed about a transverse, horizontal axis to an increasingly downwardly and rearwardly inclined position upon swinging of the gate to its released position, whereby to facilitate discharge of the accumulated bales from the trailer.

7. Harvesting apparatus as claimed in claim 1, said trailer including an elongated, downwardly and rearwardly inclined bed positioned to gravitationally receive discharging bales from the baler at a normally front end of the bed and to permit the received bales to roll to a normally rear, discharge end of the bed, said retaining means being located at said rear discharge end of the bed.

8. Harvesting apparatus as claimed in claim 7, said retaining means comprising a tailgate swingable between a generally upstanding, closed position blocking further gravitation of the bales from the bed and a downwardly and rearwardly inclined, released position permitting gravitational discharge of the bales off the rear end of the bed and down the tailgate.

9. Harvesting apparatus as claimed in claim 8, said bed being provided with means for tilting the bed about a transverse, horizontal axis to an increasingly downwardly and rearwardly inclined position upon swinging of the gate to its released position, whereby to facilitate discharge of the accumulated bales from the trailer.

* * * * *